United States Patent
Haggerty et al.

(10) Patent No.: US 10,129,407 B1
(45) Date of Patent: *Nov. 13, 2018

(54) BRIDGING A THIRD PARTY ONTO A CONTACT CENTER COMMUNICATION

(71) Applicant: Noble Systems Corporation, Atlanta, GA (US)

(72) Inventors: Christopher S. Haggerty, Atlanta, GA (US); Karl H. Koster, Sandy Springs, GA (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/109,913

(22) Filed: Aug. 23, 2018

Related U.S. Application Data

(63) Continuation of application No. 15/726,675, filed on Oct. 6, 2017.

(51) Int. Cl.
| | | |
|---|---|---|
| *H04M 3/42* | (2006.01) | |
| *H04M 3/00* | (2006.01) | |
| *H04M 5/00* | (2006.01) | |
| *H04M 3/56* | (2006.01) | |
| *H04M 7/00* | (2006.01) | |
| *H04M 3/428* | (2006.01) | |
| *H04M 3/51* | (2006.01) | |
| *H04M 3/523* | (2006.01) | |

(52) U.S. Cl.
CPC ......... *H04M 3/563* (2013.01); *H04M 3/4288* (2013.01); *H04M 3/42195* (2013.01); *H04M 3/42382* (2013.01); *H04M 3/5166* (2013.01); *H04M 3/5235* (2013.01); *H04M 7/003* (2013.01); *H04M 2203/5018* (2013.01); *H04M 2203/5081* (2013.01)

(58) Field of Classification Search
CPC . H04M 2203/5009; H04M 2203/5018; H04M 3/56; H04M 3/42025; H04M 3/5235
USPC ............ 379/207.01, 201.01, 202.01, 207.02, 379/207.15, 207.14, 211.01, 266.07
See application file for complete search history.

(56) References Cited

U.S. PATENT DOCUMENTS

| | | |
|---|---|---|
| 6,157,711 A | 12/2000 | Katz |
| 7,844,034 B1 | 11/2010 | Oh et al. |
| 8,503,650 B2 | 8/2013 | Reding et al. |
| 8,855,285 B1 | 10/2014 | Bracken et al. |
| 8,867,719 B2 | 10/2014 | Gisby et al. |

(Continued)

*Primary Examiner* — Thjuan K Addy

(57) ABSTRACT

Various embodiments of the invention provide methods, systems, and computer program products for bridging a third party onto a communication such as a telephone call or Web chat that is being conducted between a first party and a second party. Specifically, a contact, such as a telephone number or webpage address, is linked with the communication being conducted between the first and second parties and a text message is sent to the third party that includes the contact. For instance, in particular embodiments, this contact may be embedded in the text message so that the third party can simply select the contact from the text message to initiate being bridged onto the communication. Accordingly, the third party makes use of the contact to be bridged onto the communication so that the third party can converse with the first party and the second party.

18 Claims, 19 Drawing Sheets

(56) References Cited

U.S. PATENT DOCUMENTS

| | | |
|---|---|---|
| 8,898,578 B1 | 11/2014 | Hecht et al. |
| 8,934,612 B2 | 1/2015 | Ristock et al. |
| 8,942,683 B2 | 1/2015 | Doerr et al. |
| 2004/0081183 A1* | 4/2004 | Monza .................. H04L 41/06 370/412 |
| 2004/0083195 A1 | 4/2004 | McCord et al. |
| 2010/0208625 A1 | 8/2010 | Logan et al. |
| 2011/0033035 A1 | 2/2011 | Turner |

* cited by examiner

BRIDGING A THIRD PARTY ONTO A CONTACT CENTER COMMUNICATION

CROSS REFERENCE TO RELATED APPLICATIONS

This application is a continuation of U.S. patent application Ser. No. 15/726,675, filed on Oct. 6, 2017, of which the entire contents are incorporated by reference for all that they teach.

BACKGROUND

Contact centers engage with various parties for many different reasons. For instance, some contact centers operate to provide customer service for many businesses so that customers of these businesses may contact these centers to obtain assistance with activities such as, for example, placing orders for goods or returning goods for a refund. Other contact centers operate to provide technical support for businesses' customers so that these customers can find help in operating products sold by the businesses, as well as correcting problems encountered in operating these products. In addition, contacts centers engage these various parties using a variety of different channels of communication such as telephone calls, email, texts (short messaging service ("SMS") and/or multimedia messaging service ("MMS")), video chat, social media, fax, and web-based chat.

However, most engagements conducted by contact centers with parties are limited to an agent who is handling a particular communication for a contact center and a single party who is actively engaged in the particular communication. For example, an agent who is conversing on a telephone call with a party is typically limited to only conversing with the party on the call (although in some instances, an agent may be able to bridge in another employee of the contact center such as another agent or supervisor). If for some reason information is needed during the call that the party cannot provide, then the agent and party must typically end the call so that the party can go and retrieve the needed information from someone who is not present on the call.

For example, a party may be on a call with an agent who is assisting the party in applying for a loan from a bank. During the call, the agent may request personal information about the party's spouse that the party does not readily know, such as his spouse's social security number. The party may be at work so he is unable to just ask his spouse while on the call because she is not present. Therefore, the party must end the call and then call back the contact center once he has obtained his wife's social security number. However, when the party calls back, he is not likely to be routed to the same agent who handled the previous call and may be required to start from the beginning of the loan process. This can result in frustration on the part of the party. What would be helpful is if the party and agent on the initial call could have bridged the party's wife onto the call while they are still conversing to obtain the wife's social security number instead of having to end the call and forcing the party to call back once he had obtained his wife's social security number so that he could continue the loan process.

Therefore, a need in the art exists that would allow for a third party to bridge onto a communication involving a party and a contact center (e.g., agent in the contact center) during the time the party and contact center are actively engaged in the communication. It is with respect to these considerations and others that the disclosure herein is presented.

SUMMARY

In general, embodiments of the present invention provide computer program products, methods, systems, apparatus, and computing entities for bridging a third party onto a telephone call between a first party and a second party. For instance, bridging a third party onto a telephone call when a remote party and an agent in a contact center are conversing on the telephone call and a situation is encountered where the third party is needed on the call.

Therefore, various embodiments of the invention involve linking a contact telephone number with a telephone call being conducted between a first party and a second party and sending a text message to a mobile device used by a third party that includes the contact telephone number. Here, the text message may request the third party to place an inbound telephone call to the contact telephone number to be bridged onto the telephone call. In addition, the contact telephone number may also be embedded in the text message so that the third party can simply select the contact telephone number from the text message to initiate the inbound telephone call. Accordingly, the third party places an inbound telephone call to the contact telephone number and upon its receipt, a determination is made that the inbound telephone call was directed to the contact telephone number linked with the telephone call between the first party and the second party and as a result, the inbound telephone call is bridged onto the telephone call so that the third party can converse with the first party and the second party.

In particular embodiments, the determination that the inbound telephone call was directed to the contact telephone number is based on dialed number identification service. In addition, in particular embodiments, an announcement may be provided on the telephone call to the first party and/or the second party that the third party has joined the telephone call. Furthermore, in particular embodiments, the inbound telephone call may be initially routed to an interactive voice response system prior to being bridged onto the telephone call and the interactive voice response system may provide an announcement to the third party indicating the inbound telephone call is being bridged onto the telephone call. Finally, in particular embodiments, a request may be made of at least one of the first party and the second party to acknowledge the inbound telephone call should be bridged onto the telephone call before bridging the inbound telephone call onto the telephone call.

In addition, other embodiments of the present invention provide computer program products, methods, systems, apparatus, and computing entities for bridging a third party onto a Web chat between a first party and a second party. Here, in various embodiments, a webpage is linked with the Web chat being conducted between the first party and the second party and a text message is sent to a mobile device used by the third party that includes an address for the webpage. Again, the text message may request the third party to render the webpage (e.g., visit the webpage on a browser) to be bridged onto the Web chat. In addition, the address to the webpage may be embedded in the text message so that the third party can simply select the address from the text message to render the webpage. Accordingly, the third party renders the webpage and a determination is made that the webpage linked with the Web chat has been rendered. As a result, the third party is bridged onto the Web chat so that the third party can converse with the first party and the second party.

In particular embodiments, an announcement may be provided to the third party prior to being bridged onto the Web chat indicating the third party is being bridged onto the Web chat. Furthermore, in particular embodiments, a request may be made of at least one of the first party and the second party to acknowledge the third party should be bridged onto the Web chat before bridging the third party onto the Web chat. Finally, in particular embodiments, a message is displayed in the Web chat once the third party has been bridged onto the Web chat announcing the third party has been bridged onto the Web chat.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1:
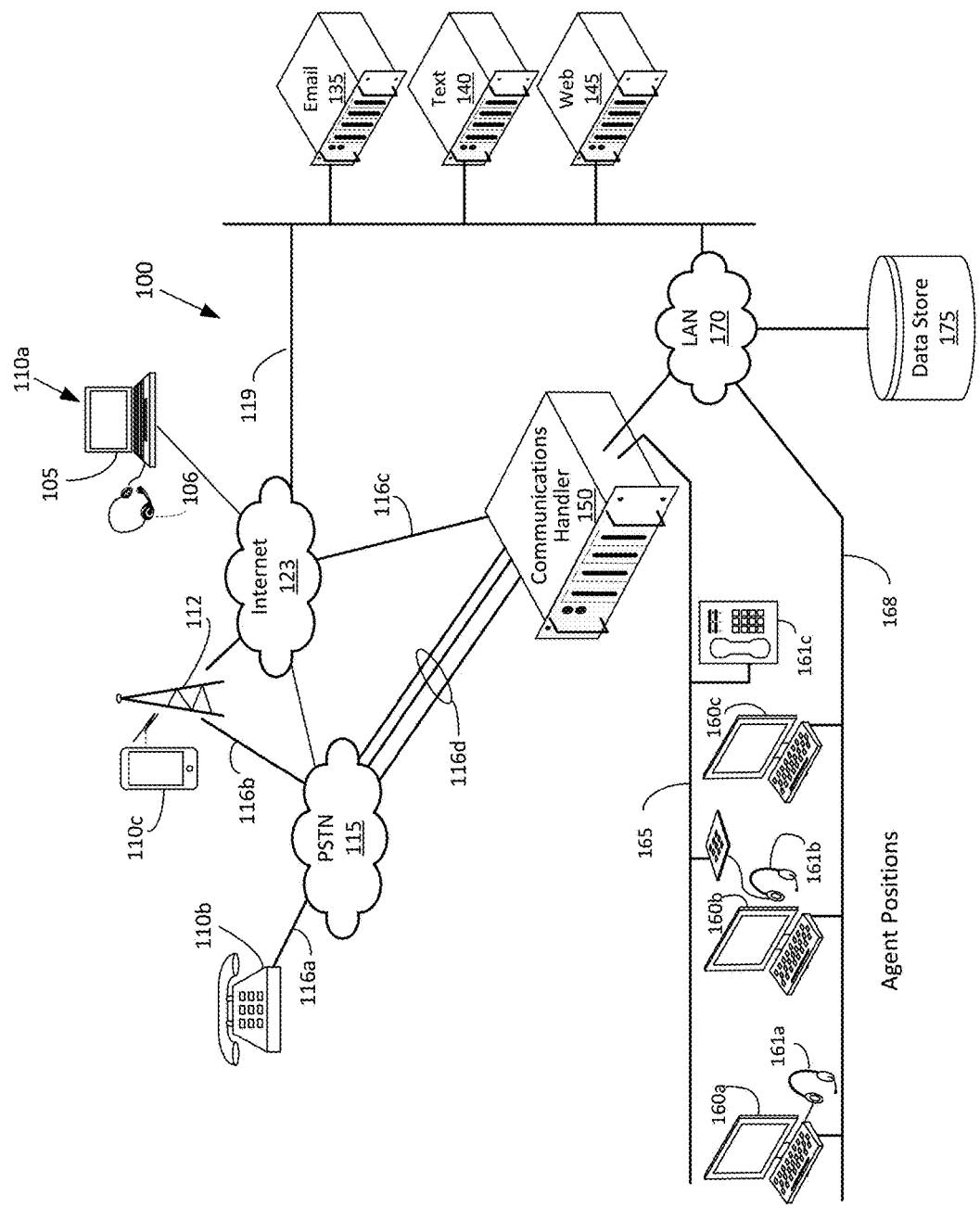
FIG. 1 illustrates an architecture of various components of a contact center that may be used in accordance with various embodiments of the present invention.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary Contact Center Architecture

FIG. 1 illustrates a contact center architecture 100 that may be used in accordance with the various technologies and concepts disclosed herein. The contact center architecture 100 shown in FIG. 1 may process voice communications and non-voice communications that are inbound-only, outbound-only, or a combination of both (sometimes referred to as a "blended" contact center). Therefore, although many aspects of contact center operation may be disclosed in the context of voice calls, the contact center may process other forms of communication such as, for example, facsimiles, emails, text messages, video chats/calls, and Web chats.

Since the contact center may handle communications originating from a party, or initiated to a party, the term "party," "user," or "customer" without any further qualification, refers to a remote person associated with a communication processed by the contact center, where the communication is either received from or placed to the party. Thus, use of these terms is not intended to limit the concepts described in this application.

Accordingly, inbound voice calls can originate from calling parties using a variety of different phone types. For instance, a calling party may originate a call from a conventional analog telephone 110b connected to a public switched telephone network ("PSTN") 115 using an analog plain old telephone service ("POTS") line 116a. The calls may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of the calls.

Inbound voice calls may also originate from a mobile phone device 110c, such as a smart phone, tablet, or other mobile device, which wirelessly communicates with a mobile service provider ("MSP") 112. The voice calls may be routed to the PSTN 115 using an integrated services digital network ("ISDN") interface 116b or other types of interfaces that are well known to those skilled in the art. In particular embodiments, the MSP 112 may also route calls as packetized voice, referred to herein as voice-over-IP ("VoIP") to an Internet provider 123 using Internet-based protocols, such as SIP or H.323 protocols. For convenience, unless indicated otherwise, the term "trunk" refers to any type of facility 116c, 116d providing voice calls to, or from, the contact center, regardless of the type of protocol or technology used. Specifically, a "trunk" is not limited to time-division multiplexing ("TDM") technology, but could refer various VoIP communication channels.

Inbound voice calls may also originate from a calling party employing a so-called "IP phone," "VoIP phone," or "soft phone" 110a. In particular embodiments, this device may comprise a computing device 105, such as a laptop, computing tablet, or other electronic device, which interfaces with a headphone/microphone combination, also referred to as a "headset" 106. An IP phone may use a digital voice control protocol and may process packetized voice data according to various Internet based voice protocols, such as session initiated protocol ("SIP") and the call may be conveyed by an Internet provider 123. Those skilled in the art will recognize that a variety of Internet Protocols ("IP") and facilities may be used to convey voice calls.

The term "voice call" may encompass a voice call using any form of currently available technology and/or originating from any type of device, such as a soft phone 110a, a conventional telephone 110b, a mobile phone 110c, or other device known in the art. The term "call" as used herein may encompass an active instance of two-way communication, an attempt to establish two-way communication, or a portion of the two-way communication. For example, a user at a conventional telephone 110b can dial a voice call in an attempt to establish two-way communication, and a call can be said to exist even prior to establishment of the two-way connection.

In various embodiments, inbound voice calls from calling parties to the contact center may be received at a communications handler 150, which could be, for instance, an automatic call distributor ("ACD"). In particular embodiments, the communications handler 150 may be a specialized switch for receiving and routing inbound calls under various conditions. Further, the communications handler 150 may be embodied as a dedicated form of equipment readily available from various manufacturers, or the communications handler 150 may be a so-called "soft switch" comprising a suitable programming module executed by a processing device to perform the necessary specialized functions. The communications handler 150 may route an incoming call over contact center facilities 165 to a phone device used by an available agent for servicing. Depending on the embodiment, the facilities 165 may be any suitable technology for conveying the call, including but not limited to a local area network ("LAN"), wide area network ("WAN"), ISDN, or conventional TDM circuits. In addition, the facilities 165 may be the same or different from the facilities used to transport the call to the communications handler 150.

The physical area at which the agent sits is often referred to as an agent "position" and these positions are often grouped into clusters managed by a supervisor, who may monitor calls and the agents' productivity. An agent typically uses a specially configured computing device 160a-160c, such as a computer with a display, and a voice device 161a-161c that is adapted for various contact center functions associated with processing communications. For instance, the voice device 161a-161c may be a soft phone device exemplified by a headset 161a connected to the computer 160a. Here, the soft phone device may be a virtual telephone implemented in part by an application program executing on the computer 160a. Further, the phone may also comprise an Internet Protocol ("IP") based headset 161b or a conventional phone 161c. Use of the term "phone" is intended to encompass all these types of voice devices used by an agent, unless indicated otherwise.

The combination of computing device 160a-160c and voice device 161a-161c may be referred to as a "workstation." Thus, for these particular embodiments, the workstation collectively has a data capability and a voice capability, although separate devices may be used. Here, data may be provided to an agent's workstation computer 160a-160c over facilities 168 along with routing the call to the agent's workstation voice device 161a-161c over other facilities 165. In some instances, "workstation" may be used in reference to either the data or voice capability at the agent's position. For example, "routing the call to the agent's workstation" means routing a call to one of the voice devices 161a-161c at the agent's position. Similarly, "routing the call to the agent" means routing a call to the appropriate equipment at an agent's position. The workstation typically has a display, provided via a computer monitor. This is used to convey information to the agent about the calls, and the agent may interact with the communications handler 150 using a mouse or other pointing device in conjunction with their computer display.

Depending on the embodiment, the agent positions may be co-located in a single physical contact center or multiple physical contact centers. The agents may be remotely located from the other components of the contact center, and may also be remotely located from each other, sometimes referred to as a "virtual contact center." In particular instances, a virtual contact center may describe a scenario in which agents work at home, using their own computers and telephones as workstations. In some configurations, a single physical location of the contact center may not be readily identifiable. For instance, this may occur when the call processing functions are provided as a service in a hosted cloud computing environment and the agents positions are in their individual residences. It is even possible for the supervisor to be remotely located (e.g., work at home), and such an arrangement does not negate the existence of the contact center.

Agents typically log onto their workstations prior to handling calls. The workstation may also communicate this login information to the communications handler 150 to allow the contact center (including the communications handler 150) to know which agents are available for handling calls. In particular embodiments, the communications handler 150 may also maintain data on an agent's skill level that may be used to route a specific call to the agent or group of agents having the same skill level. The communications handler 150 may also know what types of channels and combinations of channels the agent can handle.

Accordingly, in various embodiments, the communications handler 150 may place a call in a queue if there are no suitable agents available to handle the call, and/or the handler 150 may route the call to an interactive voice response system (e.g., server) ("IVR") (not shown) to play voice prompts. In particular embodiments, these prompts may be defined to be in a menu type structure and the IVR may collect and analyze responses from the party in the form of dual-tone multiple frequency ("DMTF") tones and/or speech. In addition, the IVR may be used to further identify the purpose of the call, such as, for example, prompting the party to enter account information or otherwise obtain information used to service the call. Further, in particular embodiments, the IVR may interact with other components such as, for example, a data store 175 to retrieve or provide information for processing the call. In other configurations, the IVR may be used to only provide announcements.

As noted, the contact center may also receive non-voice communications such as, for example, SMS and/or MMS text messages, emails, and chats. For instance, text messages may be sent by parties using smart phones 110c over a MSP 112 and the Internet 123 and are received by a text gateway server 140. Once received, the text gateway server 140 in particular embodiments may inform the communications handler 150 of the text messages and the handler 150 may then queue up the text messages for appropriate agents.

In other embodiments, the contact center may make use of one or more components separate from the handler 150, such as a communications router (not shown in FIG. 1) that instead handles the routing of various communications to agents. For instance, in these particular embodiments, the text gateway server 140 may instead inform a communications router of the text messages and the router may then queue up the text messages for appropriate agents. Similarly, the communications handler 150 may also inform the communications router of various calls so that the router can then queue up the calls for appropriate agents. However, with that said, the remainder of the specification makes reference to a communications handler 150 to carry out such functionality, although it should be understood that portions of the communication handler's 150 functionality may be performed by one or more other components within the contact center architecture 100.

Similarly, emails may be sent by users over the Internet 123 to an email server 135, and the email server 135 may inform the communications handler 150 of the emails so that the communications handler 150 can queue up the emails for appropriate agents. With respect to chats, in various embodiments a party can request a chat by accessing a website (e.g., one or more webpages) via a Web server 145. In turn, the Web server 145 informs the communications handler 150 of the chat and the handler 150 queues the appropriate agent to handle the chat.

Depending on the embodiment, the interactions between the various components shown may involve using a local area network ("LAN") 170. However, other configurations are possible, such as, but not limited to, using a wide area network, wireless network, router, bridge, direct point-to-point links, etc. Furthermore, in lieu of using facilities 165 directly linked to the communications handler 150 for conveying audio to the agents, other facilities 168 associated with the LAN 170 may be used.

In addition to receiving inbound communications, the contact center may also originate communications to parties, referred to herein as "outbound" communications. For instance, in particular embodiments, the communications handler 150 may be a dialer, such as a predictive dialer, that originates outbound calls at a rate designed to meet various criteria. Here, the communications handler 150 may include functionality for originating calls, and if so, this functionality may be embodied as a private automatic branch exchange ("PBX" or "PABX"). In addition, the communications handler 150 may directly interface with voice trunks using facilities 116c, 116d to the PSTN 115 and/or Internet provider 123 for originating calls. After the calls are originated, the communications handler 150 may perform a transfer operation to connect the calls with agents, a queue, or an IVR. Furthermore, in various embodiments, the communications handler 150 may make use of one or more algorithms to determine how and when to dial a list of numbers so as to minimize the likelihood of a called party being placed in a queue while maintaining target agent utilization. In similar fashion, the email server 135, text gateway server 140, and the Web server 145 can be utilized in various embodiments to originate outbound emails, text messages, and chats with parties.

Finally, in various embodiments, the communications handler 150 determines which agent is authorized and available to handle a communication upon being made aware of a voice or non-voice communication, and thereafter appropriately coordinates any response to the communication. In addition, the communications handler 150 may also make use of one or more schemes in allocating communications to agents such as, for example, on a round-robin basis, a least-number-served basis, a first available agent basis, and/or a seniority basis.

Although a number of the above components are referred to as a "server," each may also be referred to in the art as a "computing device," "processing system," "unit," or "system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the communications handler 150 or other component may be combined into a single hardware platform executing one or more software modules. In addition, the contact center architecture 100 may be provided as a hosted solution, where the call processing functionality is provided as a communication service (a so-called "communication-as-a-service" or "CaaS") to a contact center operator. Thus, there is no requirement that the components identified above actually be located or controlled by a contact center operator. Those skilled in art will recognize FIG. 1 represents one possible configuration of a contact center architecture 100, and that variations are possible with respect to the protocols, facilities, components, technologies, and equipment used.

Agent GUI

Figure 2:
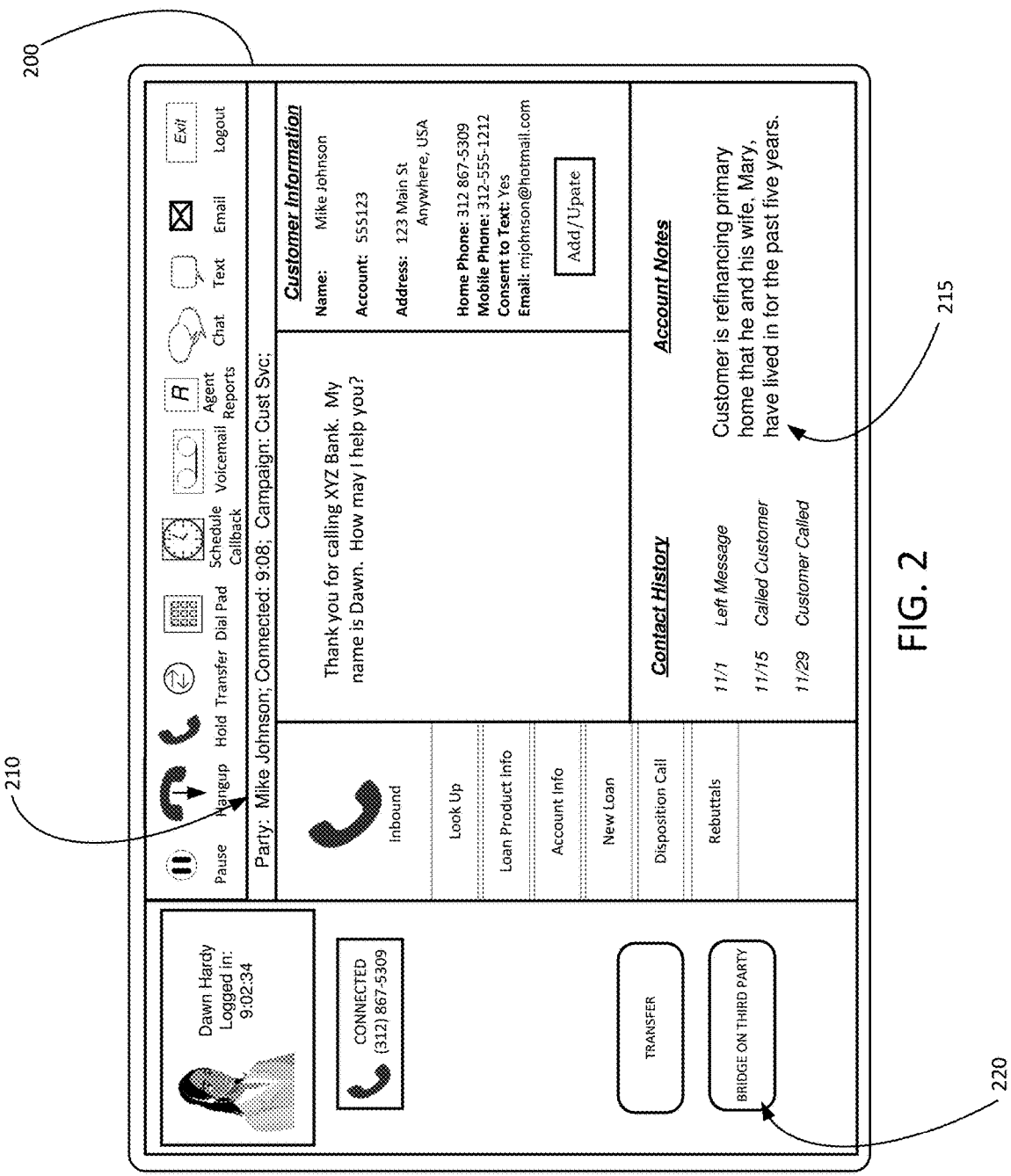
FIGS. 2-6 illustrates a graphical user interface ("GUI") used in various embodiments by an agent engaged in a telephone call session.

FIG. 2 illustrates a graphical user interface ("GUI") 200 that may be used in various embodiments by an agent that is engaged in a telephone call with a party. The GUI 200 presents the agent with detailed information about the phone call the agent is currently engaged in with the party and this information is carefully organized on the GUI 200 to facilitate an agent's interaction with the party. That is say, in particular embodiments, each section of the GUI 200 is a self-contained set of information that is displayed to the agent and has a distinct purpose, although that purpose may be related to other sections.

Here, the agent is engaged in a telephone call with Mike Johnson 210, who is shown at the top of the GUI as the party on the call. Mike is interested in refinancing his primary home that he and his wife, Mary, have lived in for the past five years as shown in the account notes 215 at the bottom-right of the GUI 200. The agent is assisting Mike on the call in completing his application for the refinancing and the agent has asked Mike for his wife's social security number. However, Mike cannot remember his wife's social security number.

The agent then asks Mike if his wife may be available to conference into (bridge onto) the call and if so, could the agent invite Mike's wife to conference in by sending her a text message with the phone number for the conference. Mike replies that yes he believes his wife is available to conference into the call and that the agent can send her a text message asking her to join the call. Accordingly, the agent selects the "BRIDGE ON THIRD PARTY" button 220 located at the bottom left of the GUI 200.

Figure 3:
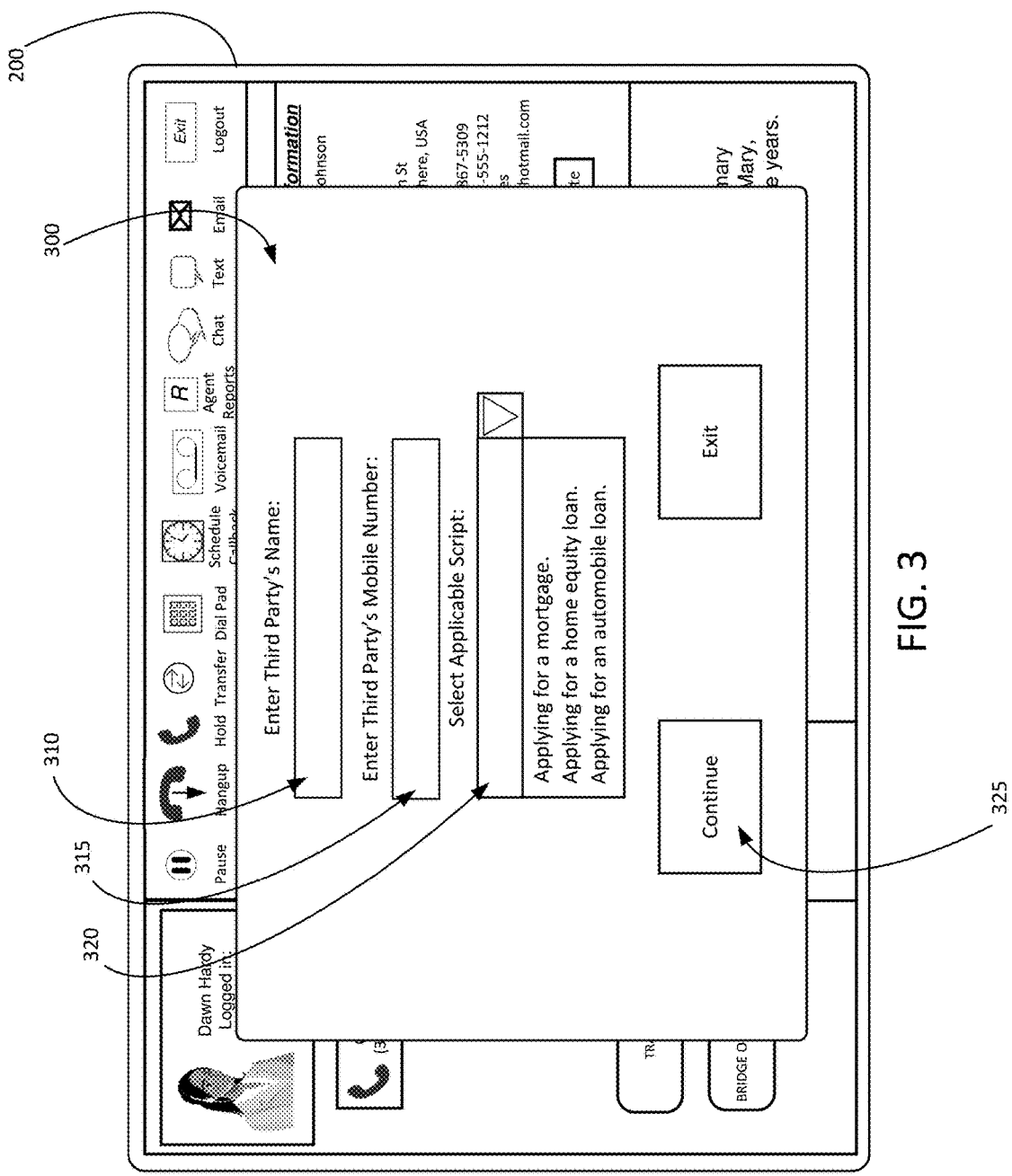

Turning now to FIG. 3, a pop-up screen 300 is provided on the GUI 200 that allows the agent to enter information that is used in sending Mike's wife a text message asking her to conference into the call the agent is currently conducting with Mike. Depending on the embodiment, the agent may send an SMS text message limited to 160 characters or a MMS text message that allows the sending of more than 160 characters, as well as media such as embedded hyperlinks and click-to-call telephone numbers. Reference to a "text message" herein refers to either an SMS or MMS text. Here, the pop-up screen 300 has a first field 310 to enter the name of the third party (e.g., Mikes' wife) who is to be bridged onto the call, a second field 315 to enter the third party's mobile telephone number, and a third field 320 (in this embodiment, a drop down menu) that allows the agent to select an applicable script that can be used to construct the text message to send to the third party. Depending on the types of calls the agent may be required to handle, the applicable scripts may include a script for a number of different situations that could be applicable in fielding calls. For instance, the agent in this example is fielding communications for XYZ Bank, and more specifically the agent is fielding communications related to customers applying for different types of loans with XYZ Bank. Therefore, in this example, the agent is provided the option of selecting a script for when a party is applying for a mortgage, a home equity loan, or an automobile loan.

Thus, in the example, the agent enters "Mary" in the first field 310, Mary's mobile phone number of "312-867-4992" in the second field 315, and selects the script option "Applying for a mortgage" for the third field 320. The agent then selects the "Continue" button 325 provided on the pop-up screen 300.

Figure 4:
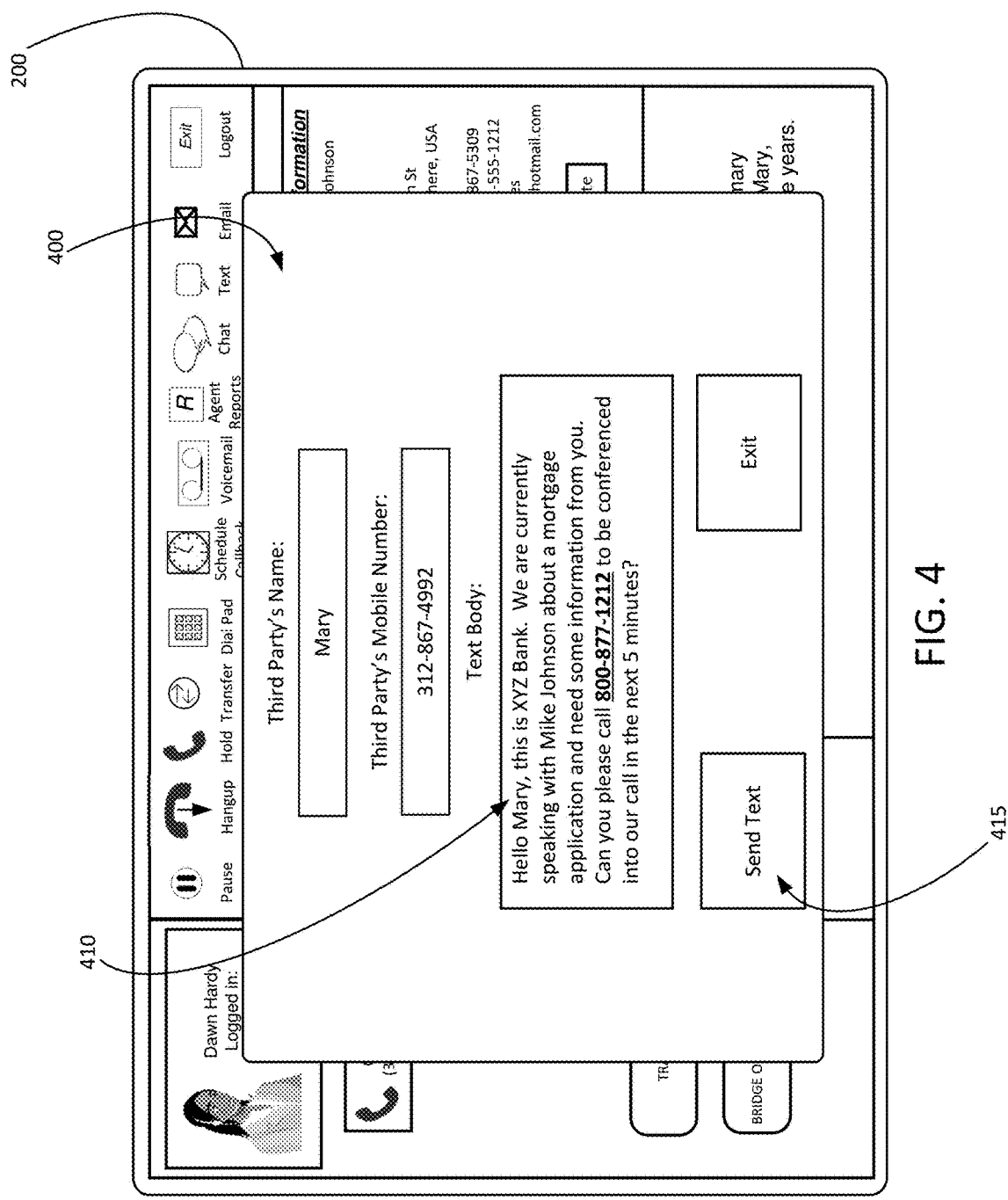

Accordingly, turning now to FIG. 4, the agent is provided with a second pop-up screen 400 on the GUI 200. Again, this particular pop-up screen 400 provides the agent with a first field and a second field to enter the third party's name and mobile phone number, respectfully. Here, the fields are populated with the entries the agent provided on the first pop-up screen 300 and the fields provide the agent with an opportunity to correct any errors that may have occurred when he or she provided the entries on the first pop-up screen 300.

In addition, the pop-up screen 400 provides a field 410 that shows the text body for the text message to be sent to the third party (e.g., Mary). In this particular instance, the text body is based on the agent's selection of the applicable script made on the first pop-up screen 300 and the body is automatically generated accordingly. Generally speaking, the text body identifies the third party, identifies the entity that has sent the text message, and provides the reason for sending the third party the text message (e.g., "Hello Mary, this is XYZ Bank. We are currently speaking with Mike Johnson about a mortgage application and need some information from you.") In addition, the text body provides a telephone number the third party can call to be conferenced into the phone call the agent is currently conducting with the party and requests the third party to call the telephone number to be conferenced into the call (e.g., "Can you please call 800-877-1212 to be conferenced into our call in the next 5 minutes?"). In particular embodiments, the telephone number may be embedded in the body of the text message so that the third party merely needs to select the telephone number in the message to initiate a call to the telephone number.

Accordingly, the text body field 415 can be edited by the agent to correct any errors and/or to customize the text message that is to be sent to the third party if desired. For instance, in the example, the agent could customize the body to indicate that the mortgage application is for a refinancing of Mike and Mary's primary home they have lived in for the past five years. Such customization may help to better identify the reason the third party has received the text message and may better entice the third party to conference into the call.

Once the agent finds the information in all of the fields is acceptable, the agent can then select the "Send Text" button 415 to send the text message to the third party. As is discussed greater detail herein, in various embodiments, a message providing the information from the fields is sent to a component within the contact center (e.g., the text gateway server 140) and the component then generates and sends the text message to the third party accordingly.

It is noted that an advantage that is realized in various embodiments by sending the text message to the third party instead of the agent simply placing the party on the call on hold and then placing a second call to the third party that can be bridged onto the call with the party is that many individuals today are in the habit of not answering calls from telephone numbers they do not recognize and/or calls that display entities' names they do not normally converse with. This is because many of these individuals believe that most of these types of calls are made from parties trying to contact them to solicit some type of good or service available for sale and in many instances, these individuals do not want to be bothered by such calls and simply ignore them.

However, by sending the third party a text message instead of simply calling them, the contact center may have a better chance of having the third party view the message, read its contents, and respond accordingly. That is to say, many individuals at least give any text message they receive a cursory read and do not completely ignore them. Therefore, the contact center may improve its chance of actually having a needed third party conference into a call between an agent and a party by sending a text message to the third party instead of simply trying to reach him or her by calling. In addition, the agent may customize the information displayed in the text message to further motivate the third party to respond.

At this point, the third party reads the text message and decides to place a call into the contact center to be conferenced into the call by selecting the telephone number embedded in the text message. Thus, in the example, Mary reads the text message on her mobile device and decides to place a call into the contact center to be conferenced into the call between the agent and her husband Mike by selecting the telephone number "800-877-1212" embedded in the text message.

Figure 5:
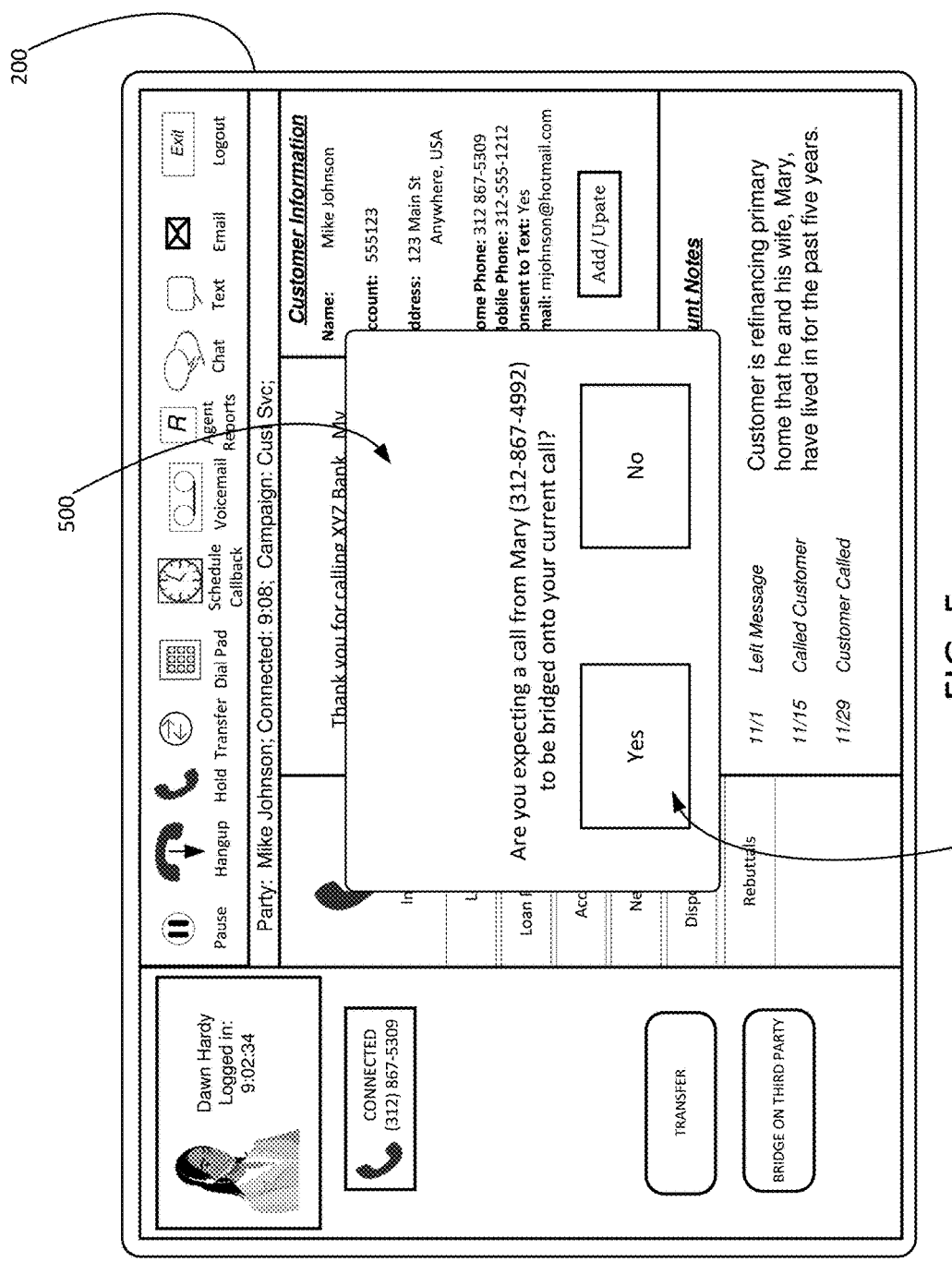

As is discussed in greater detail herein, the contact center in various embodiments receives the call from Mary and recognizes the call is related (linked) to the call the agent is currently handling with Mike based on the DNIS of the call received from Mary and sends a message to the agent asking her if she is expecting to receive a call to be bridged onto the call she is currently conducting with Mike. For instance, in particular embodiments, a pop-up screen 500, as shown in FIG. 5, is displayed on the agent's GUI 200 asking her if she is expecting to receive a call from Mary to be bridged onto the agent's current call with Mike. Here, the agent indicates yes by selecting the "Yes" button 510 provided on the pop-up screen 500 and the call from Mary is bridged onto the call the agent is currently conducting with Mike.

Figure 6:
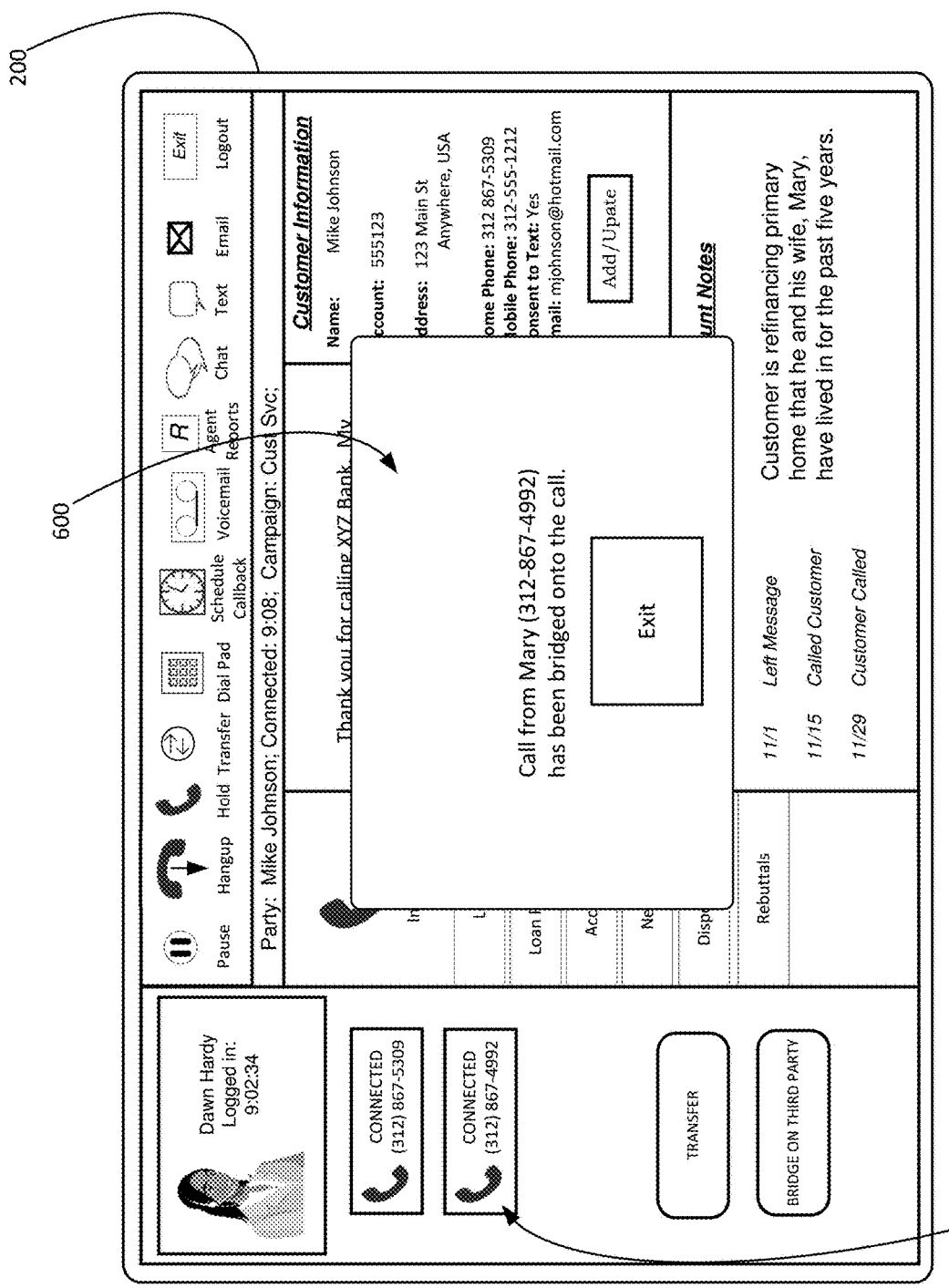

Accordingly, in particular embodiments, the agent may also be provided with another pop-up screen 600, as shown in FIG. 6, to communicate to the agent that the call from Mary has been bridged onto the call with Mike. In addition, the agent's GUI 200 may now display an indicator 610 that another telephone number is connected to the call the agent is currently handling. At this point, the agent, Mike, and Mary can converse with one another to obtain the information needed from Mary.

The GUI 200 and corresponding pop-up screens 300, 400, 500, 600 shown in FIGS. 2-6 involve bridging a call from a third party onto a call being conducted between an agent and a party. However, other channels of communication may be utilized in bridging on a third party to a communication. For instance, particular embodiments of the invention may involve bridging a third party onto a Web chat session that is currently being conducted between an agent and a party.

Figure 7:
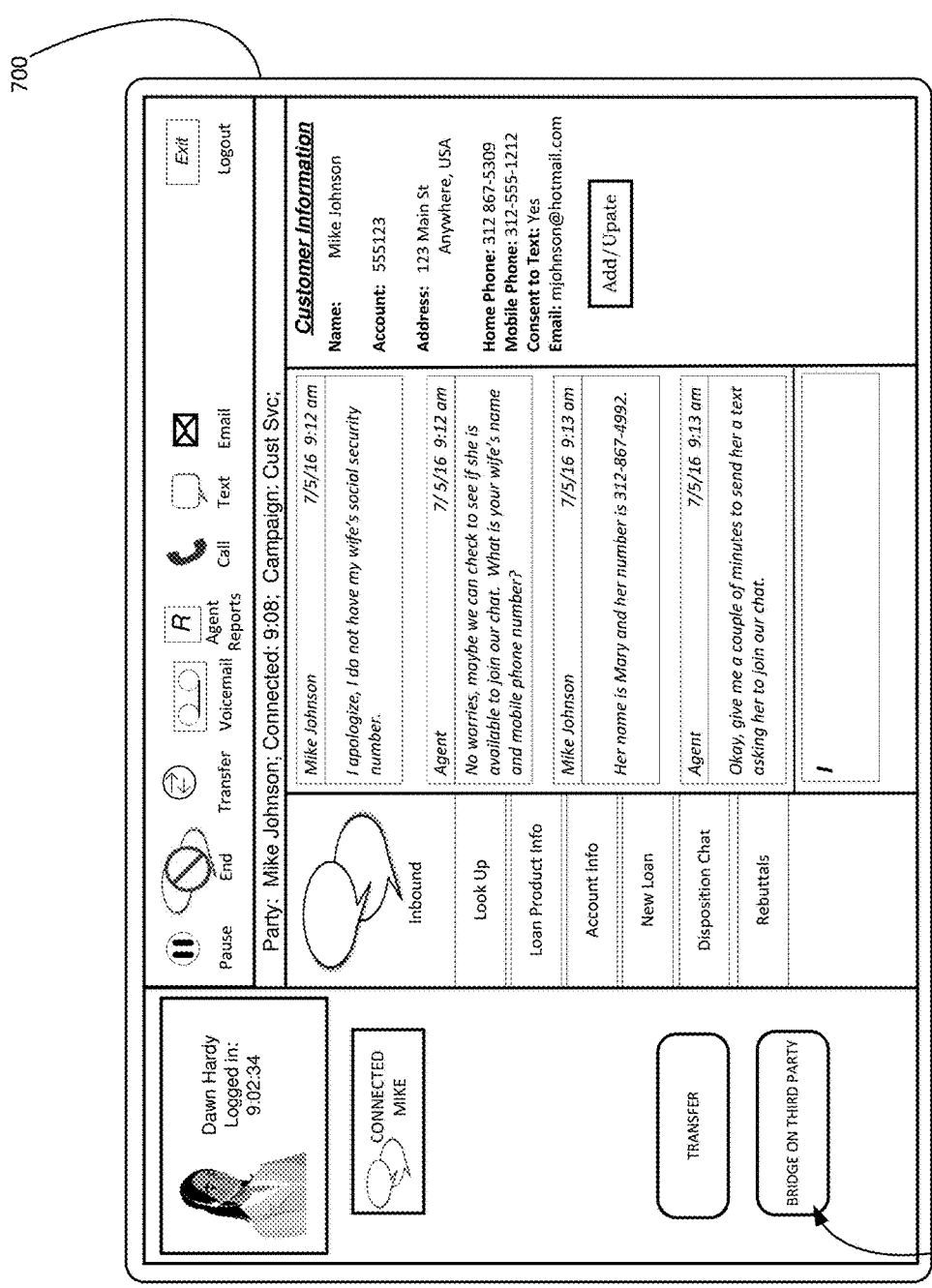
FIGS. 7-10 illustrates a GUI used in various embodiments by an agent engaged in a Web chat session.

Thus, turning now to FIG. 7, a GUI 700 is provided that may be used in various embodiments by an agent that is engaged in a Web chat with a party. Similar to the GUI 200 shown in FIG. 2, the GUI 700 shown in FIG. 7 presents the agent with detailed information about the Web chat the agent is currently engaged in with the party and this information is carefully organized on the GUI 700 to facilitate an agent's interaction with the party. That is say, in particular embodiments, each section of the GUI 700 is a self-contained set of information that is displayed to the agent and has a distinct purpose, although that purpose may be related to other sections.

Again, the example is used in which an agent is engaging with a party, Mike, who is applying for a mortgage to refinance his primary home he and his wife, Mary, have lived in for the past five years. However, the engagement in this instance involves a Web chat and not a telephone call. Therefore, the agent has requested to have Mary conferenced into the Web chat she is conducting with Mike. Accordingly, the agent selects the "BRIDGE ON THIRD PARTY" button 710 provided on the GUI 700.

Figure 8:
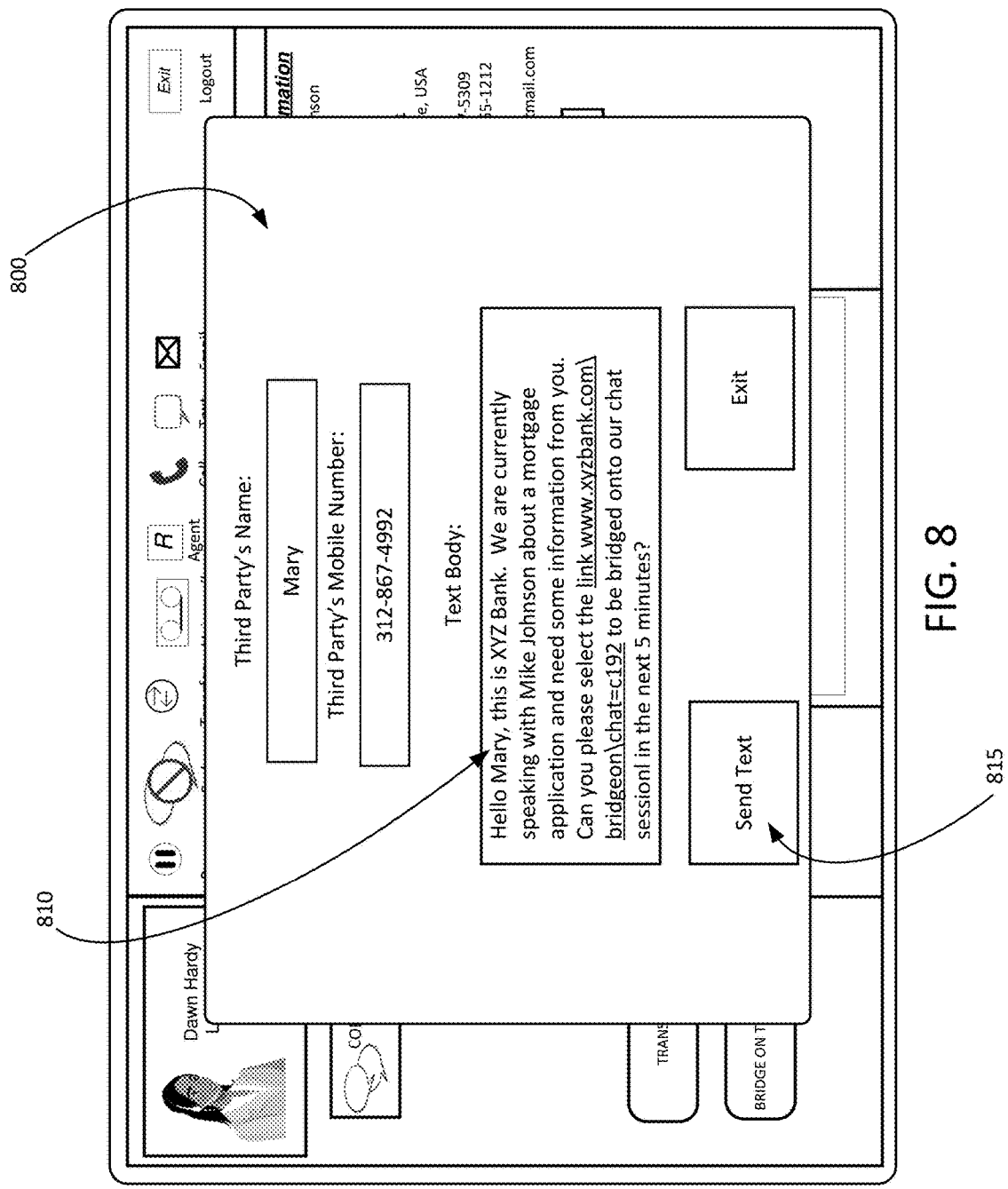
Figure 9:
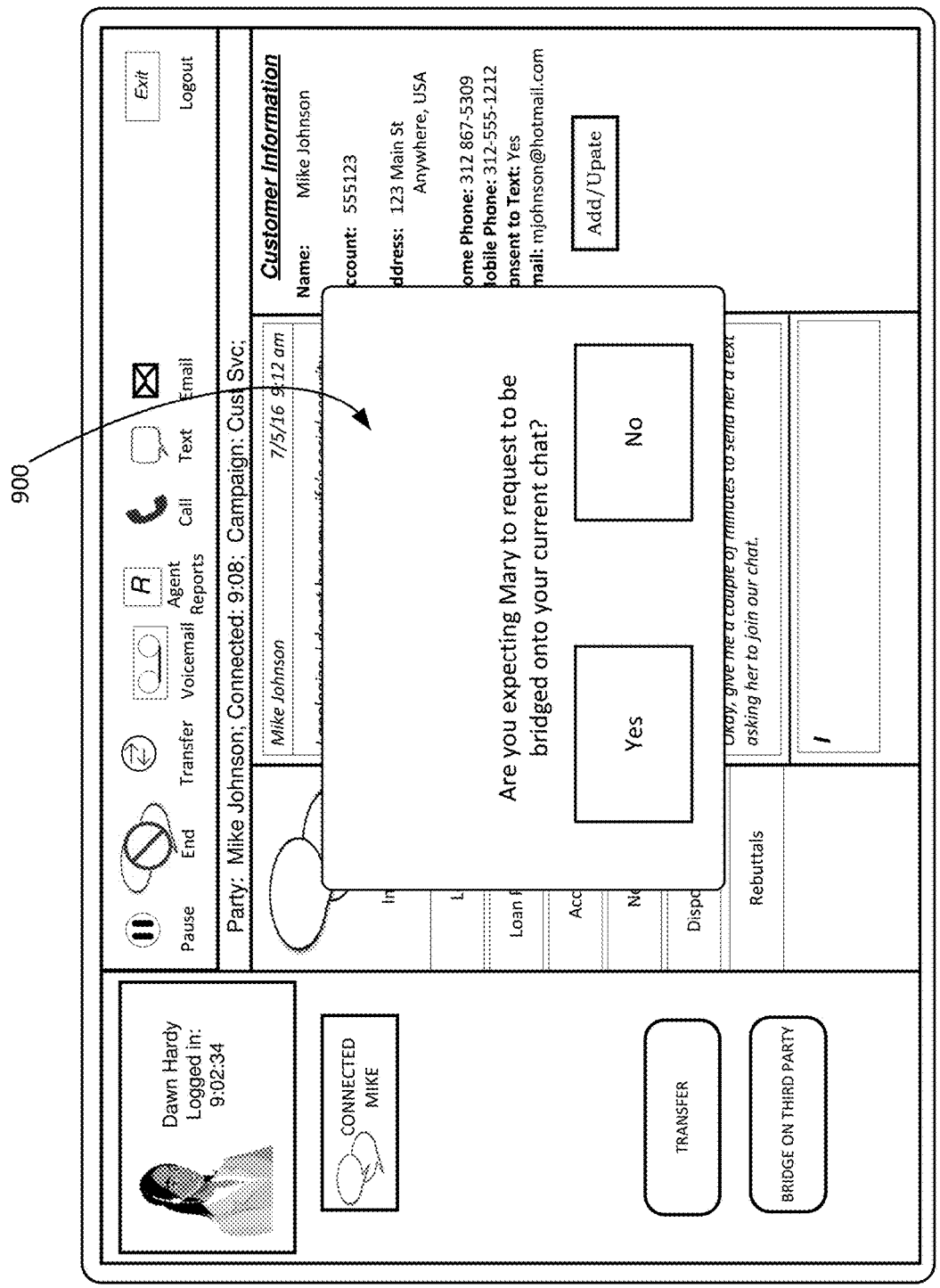

In various embodiments, the agent is initially provided with a first pop-up screen similar to the screen 300 shown in FIG. 3 so that the agent can provide information necessary to send a text message to Mary requesting her to conference into the Web chat the agent is conducting with her husband, Mike. In addition, in particular embodiments, a second pop-up screen 800, as shown in FIG. 8, is provided that displays the information needed to send Mary the text message. Here, the text body 810 provides an address to a webpage, instead of a telephone number, that Mary is to select to be conferenced into the Web chat being conducted between the agent and Mary's husband, Mike. Once the agent is happy with the information displayed on the pop-up screen 800, the agent selects the "Send Text" button 815 to send Mary the text message. Again, as mentioned above, a message is sent to a component within the contact center (e.g., the text gateway server 140) in various embodiments to generate and send the text message to Mary. Mary receives the text message and selects the webpage address embedded in the message, and the Web browser application residing on her mobile device is launched and renders the webpage associated with the address. At this point, the contact center recognizes the webpage has been rendered and asks the agent whether Mary can be bridged onto the current Web chat session with Mike. For instance, in particular embodiments, the agent is provided with the pop-up screen 900 shown in FIG. 9 asking the agent whether Mary can be bridged onto the Web chat session with Mike. The agent indicates Mary can be bridged onto the Web chat session and the contact center places Mary into the Web chat session accordingly.

Figure 10:
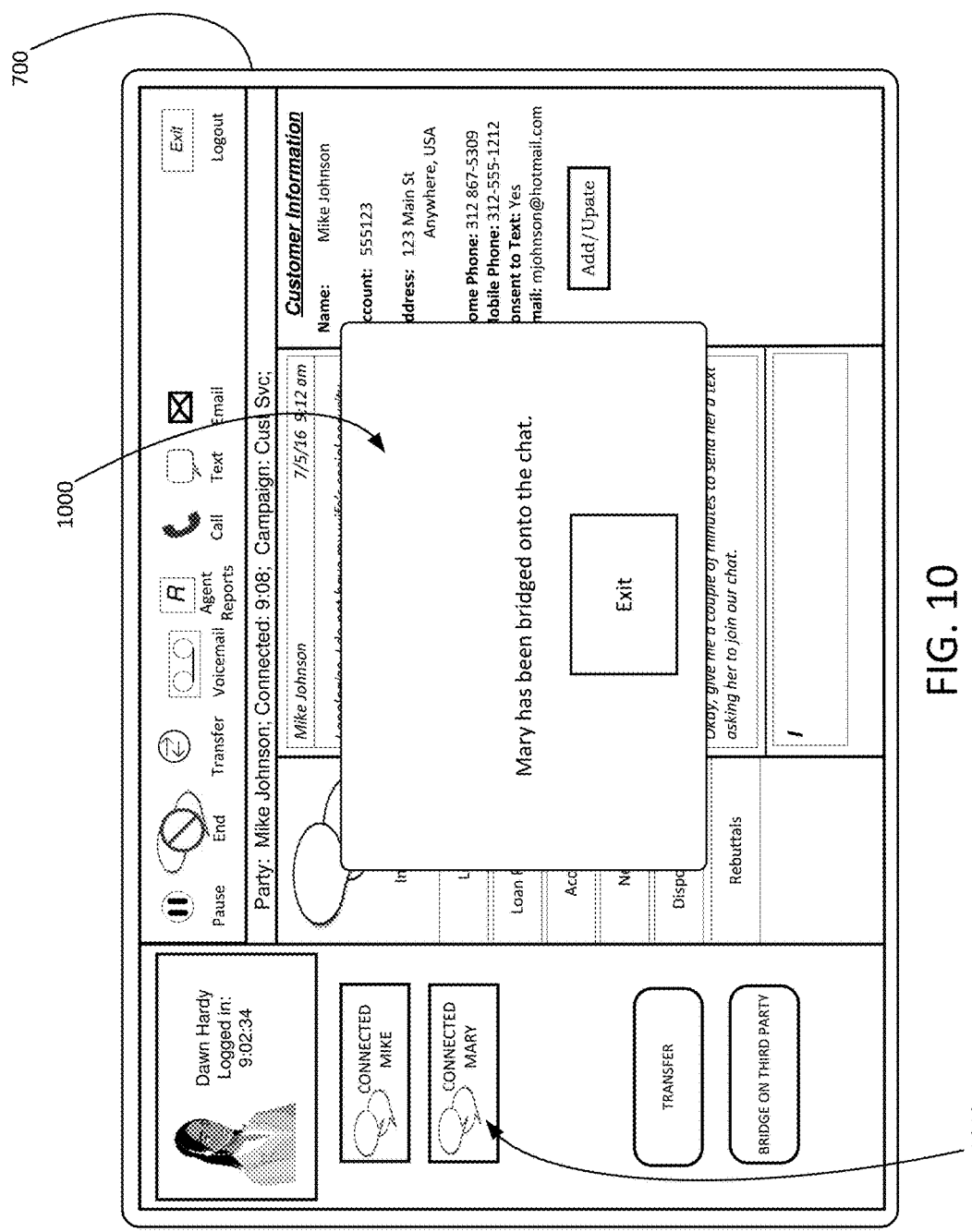

The agent is then provided with a pop-up screen 1000 in particular embodiments such as the one shown in FIG. 10. In addition, the agent's GUI 700 now displays an indicator 1010 that another party, Mary, is connected to the Web chat session. At this point, the agent, Mike, and Mary can exchange chat messages to obtain the information needed from Mary.

Figure 11:
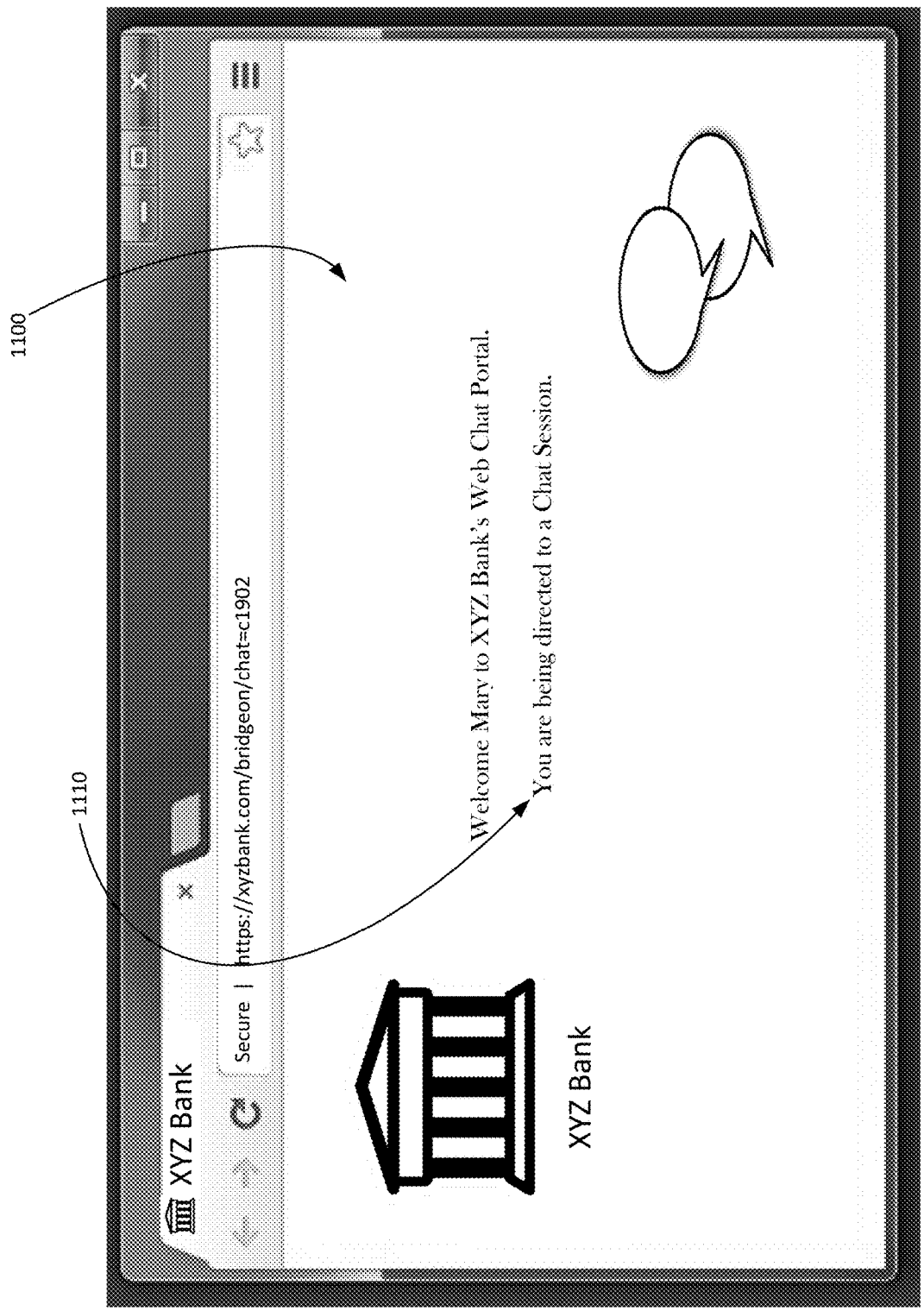
FIGS. 11-12 illustrates webpages visited by a third party in various embodiments who is bridging onto a Web chat session.

Turning briefly to FIG. 11, this figure provides the webpage 1100 that is initially rendered on Mary's browser in various embodiments as a result of her selecting the embedded address in the text message sent to her from the agent. Here, the webpage 1100 welcomes Mary to XYZ Bank's Web Chat Portal and informs her that she is being directed to a chat session 1110.

Figure 12:
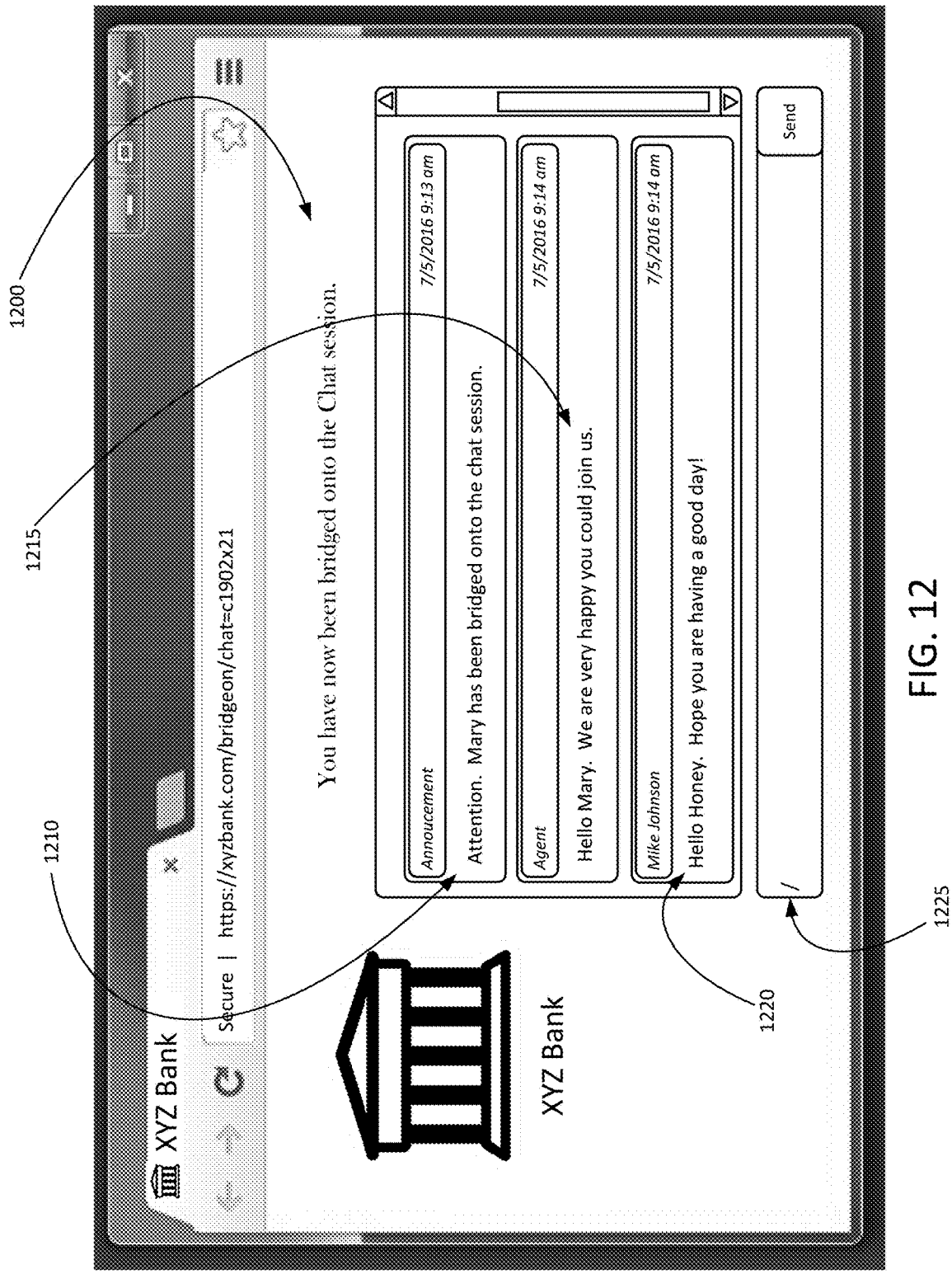

Once Mary has been bridged onto the Web chat session, Mary may be provided with a webpage 1200 such as the one shown in FIG. 12. Here, a first chat message 1210 is shown announcing Mary has been bridged onto the chat session, a second chat message 1215 from the agent is shown welcoming Mary to the chat session, and a third chat message 1220 is shown from her husband, Mike, saying hello to Mary. Thus, Mary is able to view chat messages from both the agent and her husband, Mike. In addition, a field 1225 is provided on the webpage 1200 that allows Mary to send chat messages to the session. Therefore, as a result, the agent, Mike, and Mary can converse on the Web chat session so that the needed information can be obtained from Mary.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Bridge Third Party onto Call Module

Figure 13:
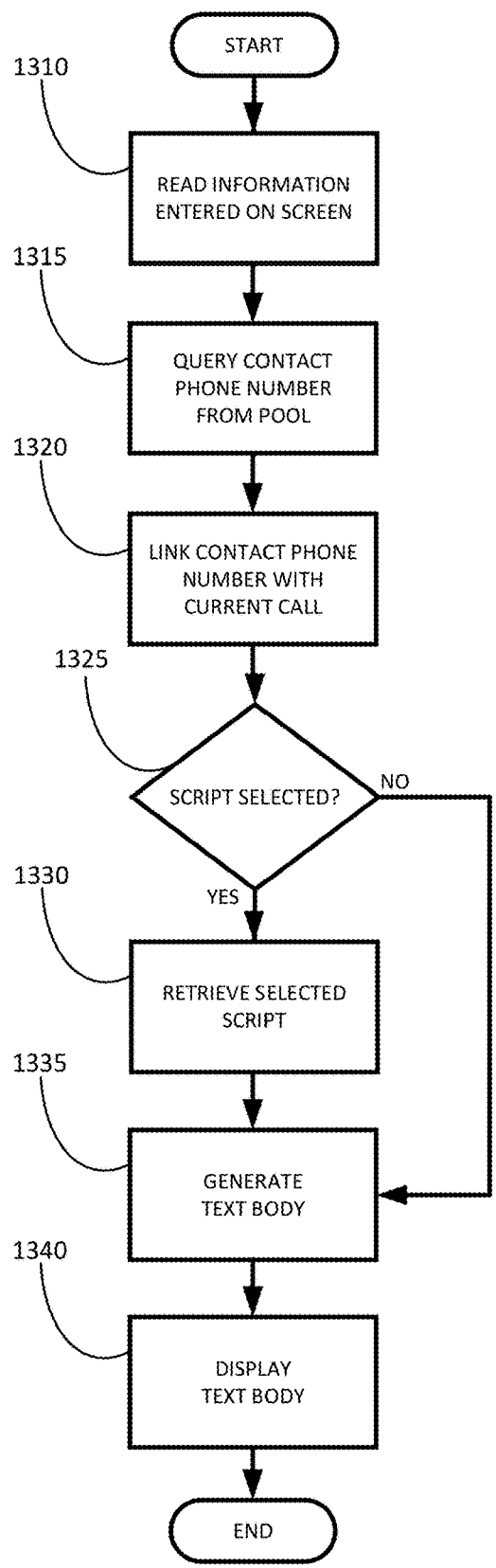
FIG. 13 illustrates a process flow for sending a third party a text message inviting the party to bridge onto a telephone call in accordance with various embodiments of the present invention.

Turning now to FIG. 13, additional details are provided regarding a process flow for sending a third party a text message inviting the party to bridge onto a telephone call according to various embodiments of the invention. In particular, FIG. 13 is a flow diagram showing a bridge third party onto call module ("BTPC module") for performing such functionality according to various embodiments of the invention. For example, the flow diagram shown in FIG. 13 may correspond to operations carried out by one or more processors in one or more components, such as, for example, an agent's computing device 160a-160c described above, as it executes the BTPC module stored in the component's volatile and/or nonvolatile memory.

In various embodiments, an agent requesting to have a third party be bridged onto a telephone call the agent is currently handling may be provided one or more screens on his or her workstation (such as the pop-up screen shown in FIG. 3) that allow the agent to enter information to be used in sending the third party a text message. For instance, in particular embodiments, the agent may enter information such as, for example, a name and mobile phone number for the third party, and/or a selection of a script that is to be used to construct the text message to send to the third party. Accordingly, the agent selects a button on one of the screens and the BTPC module is invoked to begin the process flow that involves the BTPC module reading the information entered on the one or more screens by an agent in Operation 1310.

Next, the BTPC module queries a contact telephone number from a pool of telephone numbers maintained by the contact center in Operation 1315. For instance, in various embodiments, the contact center maintains a pool of telephone numbers (e.g., a pool of 1-800 telephone numbers)

that are provided exclusively to various third parties to call into the contact center so that these parties can be bridged onto calls currently being handled by the contact center. Here, the BTPC module may access the pool of telephone numbers from some type of data storage maintained by the contact center such as the data store 175 discussed above in FIG. 1.

Once a number has been queried from the pool in various embodiments, the number is removed from the pool so that the number may not be used at the same time for two different instances of attempting to bridge on a third party onto a call. Once a third party has called a number queried from the pool and the third party has been bridged onto the appropriate call, the number may then be added back into the pool.

The BTPC module then links the queried contact phone number to the current call being handled by the agent in Operation 1320. For instance, in particular embodiments, the BTPC module performs this operation by linking an identifier for the queried contact phone number with an identifier for the current call in some type of data storage maintained by the contact center. This linking between the queried contact phone number and the call being handled by the agent enables the contact center to associate an inbound call made to the queried contact phone number with the call being handled by the agent so that the center can then bridge the inbound call onto the correct call.

At this point, the BTPC module determines whether the agent has selected a text script to assist in generating the body of the text message to be sent to the third party in Operation 1325. As stated earlier, the agent may be provided with a selection of scripts in various embodiments that he or she can select from that are used as templates to formulate the body of the text message to be sent to the third party. Generally speaking, these different scripts apply to different situations that may occur in which a third party may need to be bridged onto the call the agent is conducting with a particular party. Therefore, if the BTPC module determines the agent has selected a script in Operation 1325, then the BTPC module retrieves the selected script in Operation 1330. Again, the scripts may be stored in some type of data storage managed by the contact center.

Upon retrieving the script, the BTPC module generates the text body for the text message in Operation 1335. This operation may entail the BTPC module using information gathered specifically for the text message such as the third party's name and inserting such information into the selected script to generate the text body for the text message. For example, the selected script may recite "Hello [INSERT NAME], this is XYZ Bank." as a first sentence in the script. Here, the BTPC module may be configured to insert the name of the third party entered by the agent on his or her workstation in the placeholder [INSERT NAME] in the sentence so that the text body to send in the text message to the third party reads "Hello Mary, this is XYZ Bank."

In addition, the BTPC module may insert the queried contact telephone number into the text body of the text message so that the third party is provided a telephone number to call to be conferenced into the call. In particular embodiments, the contact telephone number is embedded into the text body so that the third party can simply select the embedded telephone number to initiate a call to the number.

Returning briefly to Operation 1325, if the BTPC module instead determines the agent has not selected a script, then the BTPC module simply generates the text body based on the other information provided by the agent. In particular embodiments, the BTPC module may be configured to use a default generic script in these situations to work from in generating the text body for the text message.

Finally, the BTPC module displays the text body to send in the text message to the agent on his or her workstation in Operation 1340. Accordingly, the agent in various embodiments is able to revise the text body to correct any errors and/or to further customize the body to send in the text message. Once the agent is satisfied with the text body, he or she can then select some type of mechanism such as a button displayed on his or her workstation to send the text body in a text message to the third party.

Bridge Third Party onto Chat Module

Figure 14:
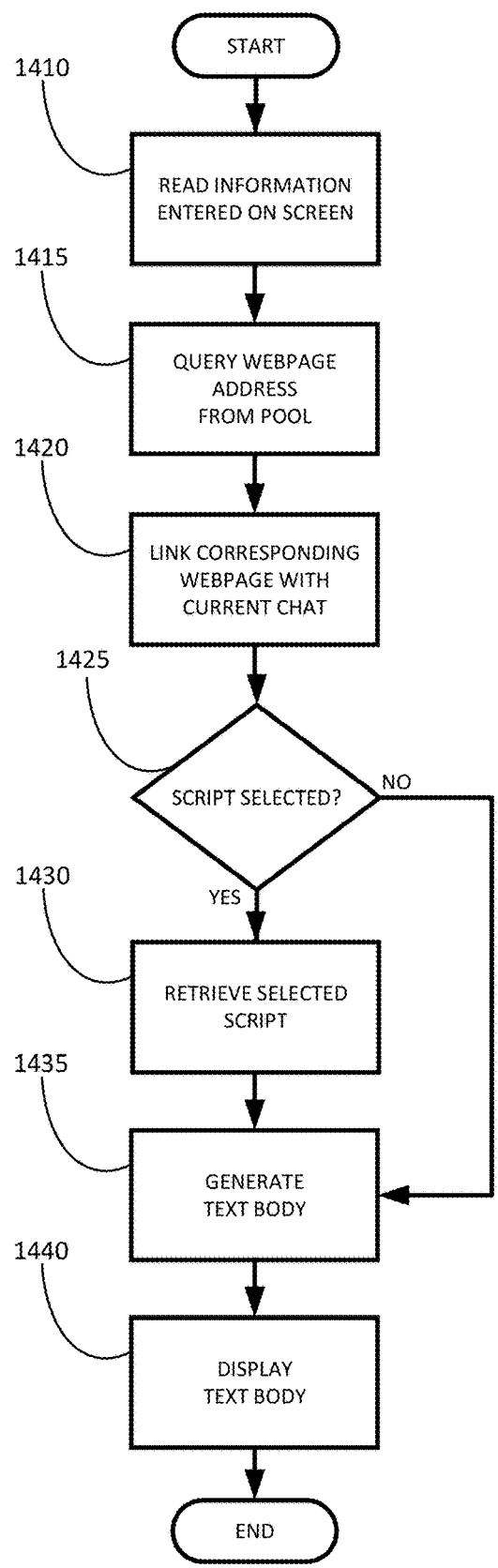
FIG. 14 illustrates a process flow for sending a third party a text message inviting the party to bridge onto a Web chat session in accordance with various embodiments of the present invention.

Turning now to FIG. 14, additional details are provided regarding a process flow for sending a third party a text message inviting the party to bridge onto a Web chat session according to various embodiments of the invention. In particular, FIG. 14 is a flow diagram showing a bridge third party onto Web chat module ("BTPWC module") for performing such functionality according to various embodiments of the invention. For example, the flow diagram shown in FIG. 14 may correspond to operations carried out by one or more processors in one or more components, such as, for example, an agent's computing device 160*a*-160*c* described above, as it executes the BTPWC module stored in the component's volatile and/or nonvolatile memory.

A number of operations performed by the BTPWC module in various embodiments involve operations that are quite similar to the operations carried out by the BTPC module discussed above. For instance, the Operations 1410, 1425, 1430, 1435, 1440 carried out by the BTPWC module that involve reading information entered by the agent on the screen of the agent's workstation, determining whether the agent selected a script, retrieving a selected script, generating the text body for the text message, and displaying the text body to the agent are performed in the same manner in various embodiments as Operations 1310, 1325, 1330, 1340 are carried out by the BTPC module discussed above.

The primary difference between the two modules is that the BTPWC module queries a webpage address in Operation 1415 from a pool of webpage addresses instead of a contact telephone number as is the case with the BTPC module. In other embodiments, the webpage address could be dynamically and uniquely generated in response to receiving the request and provided in the response. Here, since the third party is being asked to conference into a Web chat session instead of a telephone call, an address to a webpage is embedded in the text message sent to the third party. Accordingly, the corresponding webpage for the queried address is linked with the current chat session the agent is conducting in Operation 1420. Therefore, similar to the contact phone number embedded in the body of the text message, the address to the webpage embedded in the body of the text message sent to invite a third party to conference into a Web chat session can be used by the third party to render the corresponding webpage linked to the current Web chat session the agent is conducting so that the third party can then be conferenced into the Web chat session.

Send Text Message Module

Figure 15:
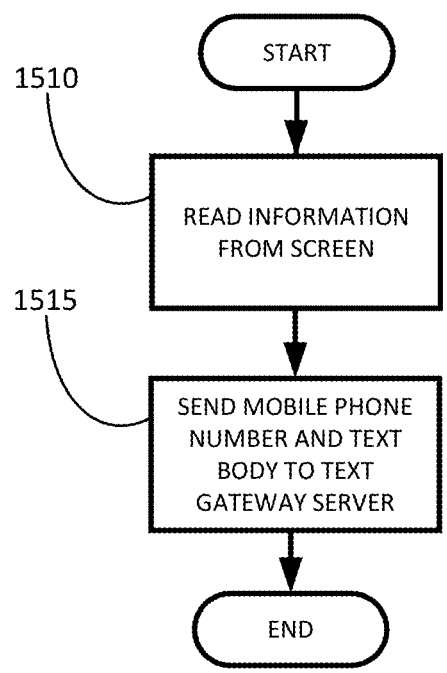
FIG. 15 illustrates a process flow for sending a third party a text message to the party's mobile device in accordance with various embodiments of the present invention.

Turning now to FIG. 15, additional details are provided regarding a process flow for sending a third party a text message to the third party's mobile device according to various embodiments of the invention. In particular, FIG. 15 is a flow diagram showing a send text message module ("STM module") for performing such functionality according to various embodiments of the invention. For example, the flow diagram shown in FIG. 15 may correspond to operations carried out by one or more processors in one or more components, such as, for example, an agent's computing device 160*a*-160*c* described above, as it executes the STM module stored in the component's volatile and/or nonvolatile memory.

In various embodiments, once the agent has reviewed the text body for the text message on his or her workstation and the agent is happy with the body, the agent can then select some type of mechanism such as a button displayed on his or her workstation to have the text message sent to the third party. Accordingly, the selection of the mechanism invokes the STM module and the module reads the information from the agent's workstation screen in Operation 1510. Such information generally includes the third party's mobile telephone number and the body for the text message.

Accordingly, the STM module then sends the mobile telephone number and the text body for the text message to a component within the contact center, such as the text gateway server 140 described in FIG. 1, in Operation 1515. In turn, this component generates the text message to include the text body and sends the generated text message to the mobile telephone number. As a result, the third party receives a text message on his or her mobile device inviting the party to conference into some type of communication session such as a telephone call or a Web chat.

Processing Inbound Call Module

Figure 16:
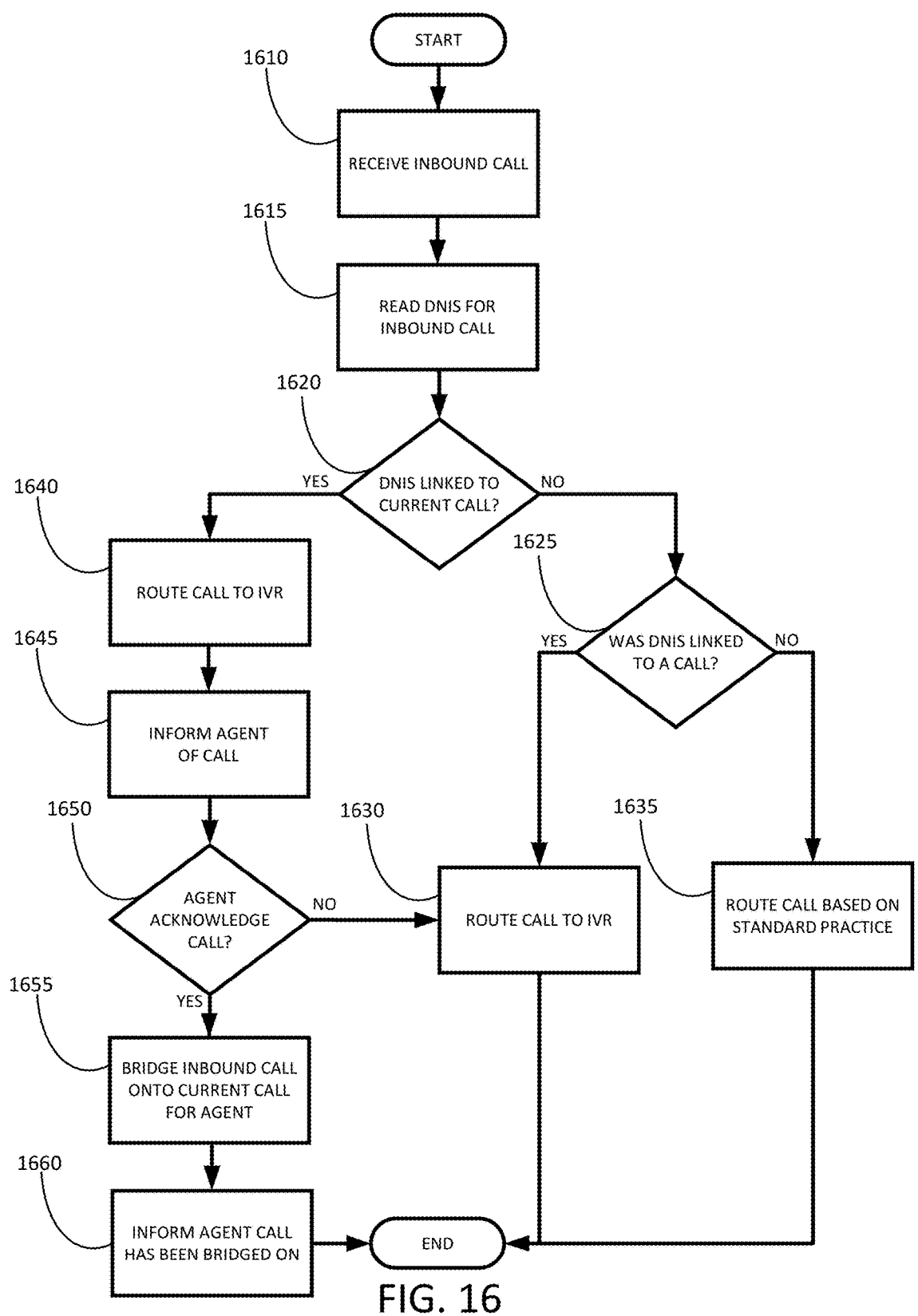
FIG. 16 illustrates a process flow for processing a received inbound call in accordance with various embodiments of the present invention.

Turning now to FIG. 16, additional details are provided regarding a process flow for processing an inbound call according to various embodiments of the invention. In particular, FIG. 16 is a flow diagram showing a process inbound call module ("PIC module") for performing such functionality according to various embodiments of the invention. For example, the flow diagram shown in FIG. 16 may correspond to operations carried out by one or more processors in one or more components, such as, for example, the communications handler 150 described above, as it executes the PIC module stored in the component's volatile and/or nonvolatile memory.

The process begins with the PIC module receiving notice of an inbound call in Operation 1610. In various embodiments, the PIC module receives information along with the notice such as the telephone number used to place the call (e.g., the automatic number identification ("ANI")) and/or the telephone number the call was placed to (e.g., the dialed number identification service ("DNIS")). Accordingly, in particular embodiments, the PIC module reads the DNIS for the received inbound call in Operation 1615.

At this point, the PIC module determines whether the DNIS of the inbound call is linked to a call currently being handled by an agent for the contact center in Operation 1620. If not, then the PIC module determines whether the DNIS of the inbound call was linked to a prior call that was handled by an agent in Operation 1625. For instance, a third party may have been invited to conference into a call that an agent was handling and a text message was sent to the third party that included a contact telephone number for the third party to call to conference into the call the agent was handling. However, the agent may have ended the call before the third party had an opportunity to call the contact telephone number. Therefore, although the DNIS of the inbound call received from the third party is linked to a call, the agent is no longer handling the particular call the DNIS was linked to.

Accordingly, if the PIC module determines the DNIS of the inbound call was linked to a prior call, then the PIC module routes the inbound call to an IVR in Operation 1630. In these instances, the IVR may inform the third party on the call that he or she can no longer be conferenced into the expected call because the call has ended. Depending on the embodiment, the IVR may then perform some other function such as, for example, asking the third party if he or she wishes to be connected with an agent anyhow. That way the third party may still be able to provide the needed information although the call the third party was to be bridged onto has ended.

If instead the PIC module determines the DNIS was not linked to a call, then the PIC module routes the call based on the contact center's standard practice in Operation 1635. For instance, in particular embodiments, the contact center may make use of skills-based routing and/or other criteria to select which agent to route the inbound call to. Those of ordinary skill in the art can envision other standard methods that may be employed by a contact center in routing an inbound call to an agent in light of this disclosure.

Returning to Operation 1620, if however the PIC module determines the DNIS of the inbound call is linked to a call currently being handled by an agent, then the PIC module in particular embodiments initially routes the call to an IVR in Operation 1640. Such an operation may be performed so that the IVR can inform the party on the inbound call to please hold while the call is being conferenced into an existing call. However, in other instances, such an operation may be performed so that a determination can be made that the party on the inbound call is expecting to be bridged onto an existing call before the inbound call is actually bridged onto the call. Therefore, the IVR may inquire as to whether the party on the inbound call is expecting to be conferenced into a call. If the party on the inbound call responds that he or she is expecting to be conferenced into an existing call, then the IVR responds to the PIC module in the affirmative.

At this point, the PIC module informs the agent who is currently handling the call of the inbound call that is to be bridged onto the call in Operation 1645. Again, depending on the embodiment, the PIC module may simply inform the agent that a call is being bridged onto the call the agent is currently handling or the PIC module may inquire as to whether the agent is expecting a call to be bridged onto the call the agent is currently handling.

Thus, in various embodiments, the PIC module determines whether the agent is expecting a call to be bridged onto the call the agent is currently handling in Operation 1650. If not, then the PIC module routes the inbound call to an IVR so that the IVR can explain to the party on the inbound call that he or she will not be conferenced into an existing call. Again, depending on the embodiment, the IVR may provide the party on the inbound call with options such as, for example, being routed to another agent.

However, if the PIC module determines the agent has acknowledged that he or she is expecting a call to be bridged onto the call the agent is currently handling, then the PIC module bridges the inbound call onto the call the agent is currently handling in Operation 1655. In addition, the PIC module informs the agent that the inbound call has been bridged onto the call the agent is currently handling in Operation 1660. For instance, in particular embodiments, the PIC module initiates having a message pop up on the agent's workstation informing the agent that the inbound call has been bridged onto the call the agent is currently handling. While in other embodiments, the PIC module may play an audio message that only the agent or the agent and party on the call can hear announcing the third party has been bridged onto the call. At this point, the agent, the party on the call, and the third party who has been conferenced into the call can converse with one another.

Processing Webpage Access Module

Figure 17:
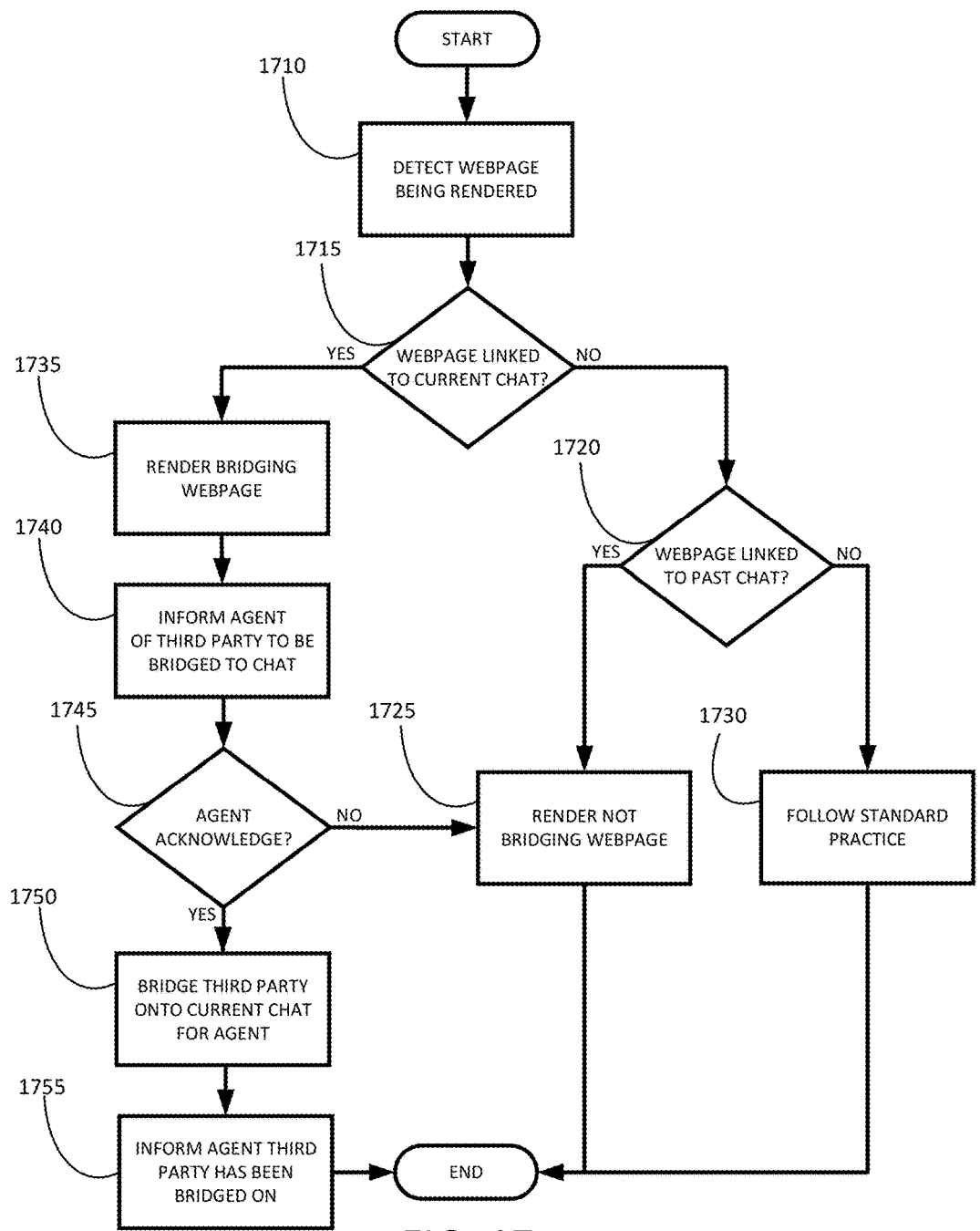
FIG. 17 illustrates a process flow for the rendering of a webpage in accordance with various embodiments of the present invention.

Turning now to FIG. 17, additional details are provided regarding a process flow for processing access to a webpage according to various embodiments of the invention. In particular, FIG. 17 is a flow diagram showing a process webpage access module ("PWA module") for performing such functionality according to various embodiments of the invention. For example, the flow diagram shown in FIG. 17 may correspond to operations carried out by one or more processors in one or more components, such as, for example, the Web server 145 described above, as it executes the PWA module stored in the component's volatile and/or nonvolatile memory.

As the reader may recall, when a third party is invited to join a Web chat that is occurring, the third party is sent a text message in various embodiments that contains an embedded address to a webpage and the party is asked to select the address to be conferenced into the Web chat. Therefore, upon the third party selecting the address, the process begins with the PWA module detecting the webpage has been rendered in Operation 1710.

The PWA module then determines whether the rendered webpage is linked to a Web chat that is currently being conducted by an agent for the contact center in Operation 1715. If not, then the PWA module determines whether the webpage is linked to a past Web chat that was handled by an agent but is no longer taking place in Operation 1720. Again, similarly to conferencing to a call, a third party may have been invited to conference into a Web chat that an agent was handling and a text message was sent to the third party that included an address to a webpage for the third party to select to conference into the Web chat the agent was handling. However, the agent may have ended the chat before the third party had an opportunity to select the address to the webpage. Therefore, although the webpage is linked to a chat, the agent is no longer handling the particular chat the webpage was linked to.

Accordingly, if the PWA module determines the webpage is linked to a past chat, then the PWA module has a new webpage rendered to the third party in Operation 1725. In these instances, the new webpage may inform the third party that he or she can no longer be conferenced into the expected Web chat because the chat has ended. Depending on the embodiment, the webpage may also provide the third party with options such as, for example, allowing the third party to begin a Web chat with an agent anyway if he or she wishes to. That way the third party may still be able to provide the needed information although the chat the third party was to be bridged onto has ended.

If instead the PWA module determines the webpage is not linked to a past chat, then the PWA module follows a standard practice set up by the contact center for handling incoming requests for a Web chat in Operation 1730. For instance, in particular embodiments, the contact center may make use of skills-based routing and/or other criteria to select an agent to handle a Web chat with the third party. Those of ordinary skill in the art can envision other standard methods that may be employed by a contact center in routing a Web chat to an agent in light of this disclosure.

Returning to Operation 1715, if however the PWA module determines the webpage is linked to a chat currently being handled by an agent, then the PWA module in particular embodiments initially renders a webpage to the third party in Operation 1735 informing the party that he or she is being conferenced into an existing Web chat. In some instances, such an operation may be performed so that a determination can be made that the party visiting the webpage is expecting to be bridged onto an existing Web chat before the party is actually bridged onto the chat. Therefore, the webpage rendered to the party may inquire as to whether the party is expecting to be conferenced into a Web chat.

If the party responds in the affirmative, then the PWA module in particular embodiments informs the agent who is currently handling the Web chat that a party is to be bridged onto the chat in Operation 1740. Again, depending on the embodiment, the PWA module may simply inform the agent that a party is being bridged onto the Web chat the agent is currently handling or the PWA module may inquire as to whether the agent is expecting to have a party bridged onto the Web chat the agent is currently handling.

Thus, in various embodiments, the PWA module determines whether the agent is expecting a party to be bridged onto the Web chat the agent is currently handling in Operation 1745. If not, then the PWA module renders a new webpage to the party explaining that he or she will not be conferenced into an existing Web chat. Again, depending on the embodiment, the webpage may provide the party with options such as, for example, being routed to another agent to chat.

However, if the PWA module determines the agent has acknowledged that he or she is expecting a party to be bridged onto the Web chat the agent is currently handling, then the PWA module bridges the party onto the chat in Operation 1750. In particular embodiments, this operation entails the PWA module rendering a new webpage to the party that provides one or more chat messages that have been entered by the agent and/or original party on the chat, as well as functionality so that the third party can enter chat messages. In addition, the PWA module informs the agent that the third party has been bridged onto the Web chat in Operation 1755. For instance, in particular embodiments, the PWA module initiates having a message pop up on the agent's workstation informing the agent that the third party has been bridged onto the Web chat. While in other embodiments, the PWA module provides a chat message that announces the third party has been bridged onto the Web chat. At this point, the agent, the original party on the chat, and the third party who has been conferenced into the chat can converse with one another by sending chat messages.

Agent GUI Bridging Module

Figure 18:
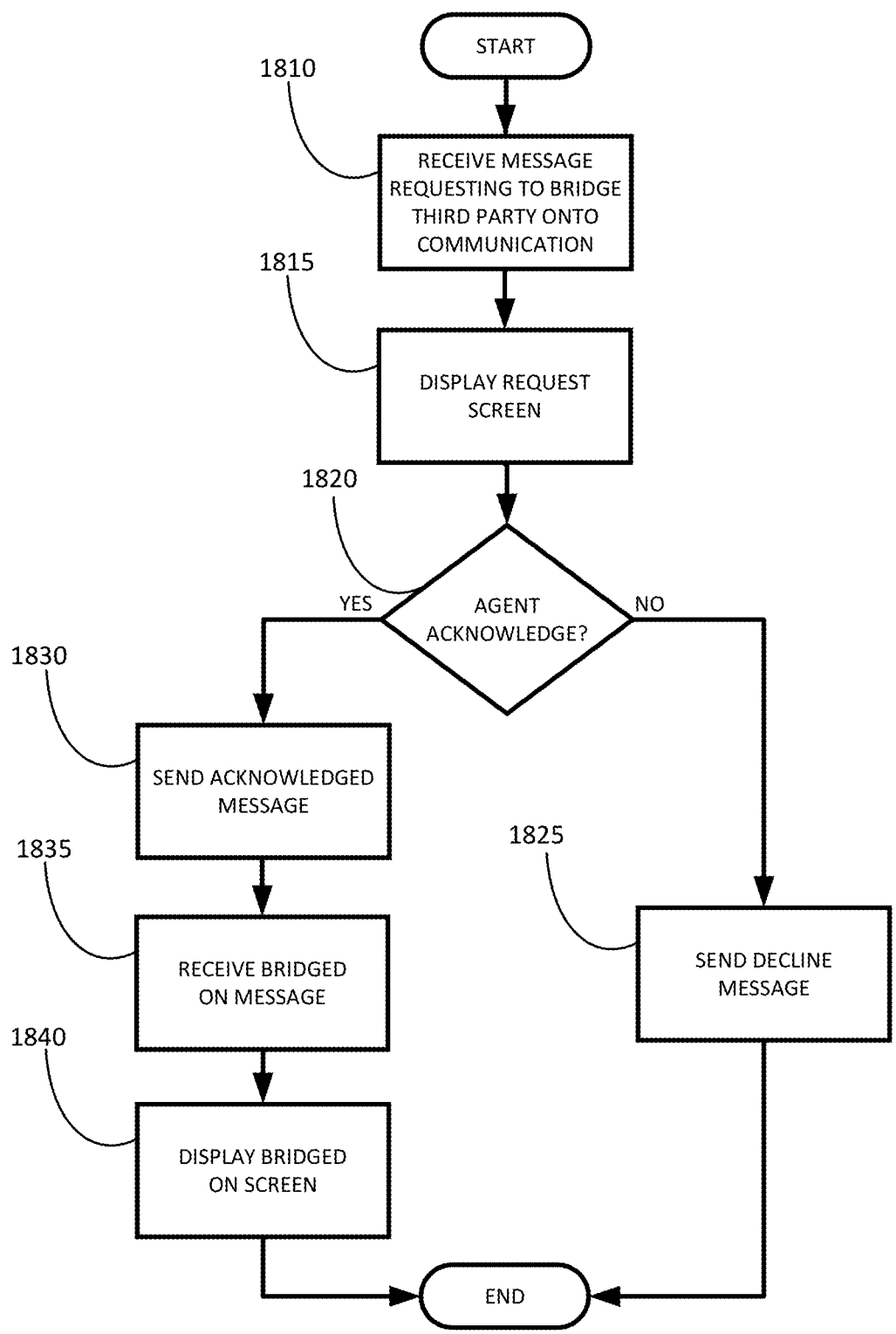
FIG. 18 illustrates a process flow for displaying messages on an agent's GUI during bridging of a third party onto a communication being handled by the agent in accordance with various embodiments of the present invention.

Turning now to FIG. 18, additional details are provided regarding a process flow for displaying messages on an agent's GUI during the bridging of a third party onto a communication being handled by the agent according to various embodiments of the invention. In particular, FIG. 18 is a flow diagram showing an agent GUI bridging module ("AGB module") for performing such functionality according to various embodiments of the invention. For example, the flow diagram shown in FIG. 18 may correspond to operations carried out by one or more processors in one or more components, such as, for example, an agent's computing device 160a-160c described above, as it executes the AGB module stored in the component's volatile and/or nonvolatile memory.

Here, the contact center is attempting to bridge a third party onto a communication an agent is currently handle. For instance, the agent may be currently handling a telephone call and the contact center is attempting to bridge onto the call a third party who has placed an inbound call to the contact center. While in another instance, the agent may be currently handling a Web chat and the contact center is attempting to bridge onto the Web chat a third party who has render a particular webpage linked to the Web chat. Accordingly, the contact center (e.g., one of more components within the contact center) may send one or more messages to the agent's workstation to facilitate bridging the third party onto the communication and the AGB module may receive these messages accordingly.

Thus, turning to FIG. 18, the process begins with the AGB module receiving a message requesting to bridge a third party onto a communication the agent is currently handling in Operation 1810. Depending on the embodiment, the message may provide a variety of information such as, for example, the name of the third party and/or the channel of communication that the party is to be bridged onto. For example, an agent may be currently handling both a telephone call and a Web chat. Therefore, the message received by the AGB module may indicate whether the contact center is attempting to bridge a third party onto the telephone call or the Web chat.

Accordingly, in various embodiments, the AGB module displays a pop-up screen to the agent asking the agent if he or she is expecting to bridge a third party onto one of the communications the agent is currently handling in Operation 1815 in response to receiving the message. Accordingly, the agent provides a response and the AGB module determines whether the agent has acknowledged in the affirmative that he or she is expecting to bridge a third party onto one of the communications the agent is currently handling in Operation 1820.

If the agent responds in the negative, then the AGB module sends a decline message to the appropriate component within the contact center in Operation 1825. For instance, in particular embodiments, if the agent has been requested to bridge a third party onto a telephone call the agent is currently handling and the agent responds in the negative, then the AGB module sends a decline message to the communications handler 150 informing the handler 150 not to bridge the third party onto the call the agent is currently handling.

However, if the agent responses in the positive, then the AGB module sends an acknowledged message to the appropriate component within the contact center to bridge the third party onto the communication in Operation 1830. Accordingly, the appropriate component bridges the third party onto the communication and sends the AGB module a message indicating the third party has been bridged onto the communication in Operation 1835. In turn, the AGB module displays some type of screen (e.g., a pop-up screen) on the agent's workstation indicating the third party has been bridged onto the communication in Operation 1840. At this point, the agent is now aware a third party has been bridged onto the communication and the agent can inform the original party on the communication that the third party has been bridged onto the communication, as well as welcome the third party.

Exemplary Processing Device Architecture

Figure 19:
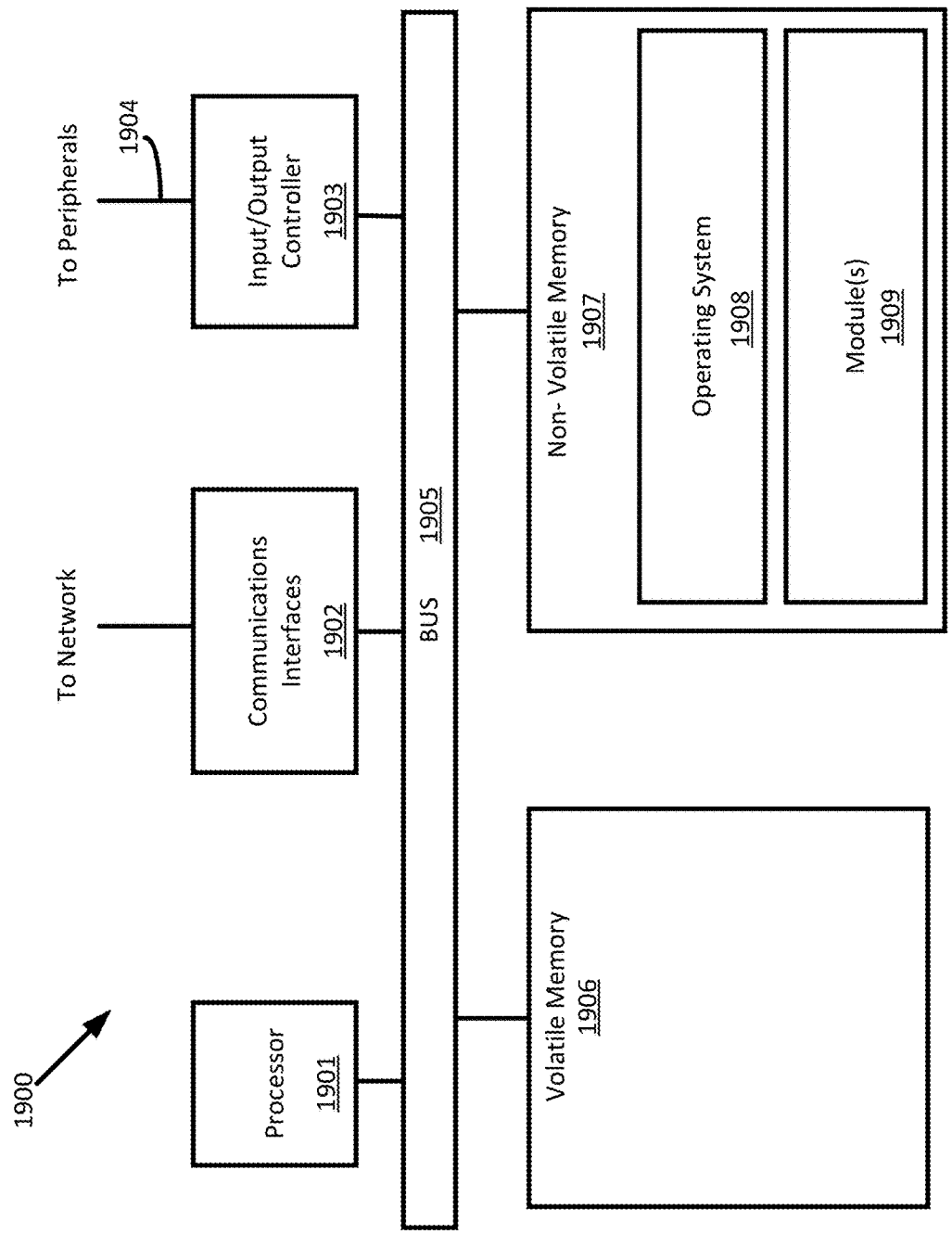
FIG. 19 is an exemplary schematic diagram of a processing component used in various embodiments of the contact center architecture to practice the technologies disclosed herein.

As discussed in conjunction with FIG. 1, the contact center architecture 100 may comprise various components. Accordingly, FIG. 19 is an exemplary schematic diagram of a processing component 1900 that may be used in various embodiments of the contact center architecture 100 to practice the technologies disclosed herein such as, for example, the communications handler 150, the email server 135, the text gateway server 140, the web server 145, and/or an agent's computing device 160*a*-160*c*. In general, the term "processing component" may be exemplified by, for example, but without limitation: various types of computers, servers, blades, gateways, switches, and the like, as well as any combination of devices or entities adapted to perform the functions described herein.

As shown in FIG. 19, the processing component 1900 may include one or more processors 1901 that may communicate with other elements within the processing component 1900 via a bus 1905. The processor 1901 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing component 1900 may also include one or more communication interfaces 1902 for communicating data via the local network with various external devices, such as other components of FIG. 1. Depending on the embodiment, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.'

The processing component 1900 may further include an input/output controller 1903 that may communicate with one or more input devices or peripherals using an interface 1904, such as, but not limited to: a keyboard, a mouse, a touch screen/display input, microphone, pointing device, etc. The input/output controller 1903 may also communicate with output devices or peripherals, such as displays, printers, speakers, headsets, banner displays, etc.

The processor 1901 may be configured to execute instructions stored in volatile memory 1906, non-volatile memory 1907, or other forms of computer-readable storage media accessible to the processor 1901. The volatile memory 1906 may comprise various types of memory technologies, including, but not limited to: random access memory ("RAM"), dynamic random access memory ("DRAM"), static random access memory ("SRAM"), and other forms well known to those skilled in the art. The non-volatile memory 1907 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1907 may store program code and data, which also may be loaded into the volatile memory 1906 at execution time. Specifically, the non-volatile memory 1907 may store one or more program modules 1909, such as the various modules described above containing instructions for performing the processes and/or functions associated with the technologies disclosed herein, and/or operating system code 1908. In addition, these program modules 1909 may also access, generate, or store data 1910, in the non-volatile memory 1907, as well as in the volatile memory 1906. The volatile memory 1906 and/or non-volatile memory 1907 may be used to store other information including, but not limited to: records, applications, programs, scripts, source code, object code, byte code, compiled code, interpreted code, machine code, executable instructions, or the like. These may be executed or processed by, for example, the processor 1901 and/or may form a part of, or may interact with, the program modules 1909.

The technologies described herein may be implemented in various ways, including as computer program products comprising memory storing instructions causing a processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-Ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

Alternative Embodiments

Applicant notes that although the embodiments described herein make use of a text message to invite a third party to conference into (bridge onto) a communication being conducted by a contact center, embodiments of the invention are contemplated that make use of other forms of communication to invite a third party to conference into a communication. For instance, in particular embodiments, an email may be used instead of a text message. Here, similar to a text message, the body of the email may include an embedded telephone number or webpage address that the third party can select to initiate conferencing into the communication. While other forms of communication may be used in other embodiments such as instant messaging for example.

In addition, embodiments of the invention are contemplated that bridge a third party onto a communication that is not necessarily being handled by an agent. For instance, in particular embodiments, a party may be interacting with a component within the contact center such as an IVR and the IVR may initiate a process for bridging a third party onto the communication being conducted between the party and the IVR. For example, an IVR may be gathering information from a party on a telephone call and the IVR may request a piece of information the party cannot provided. Here, in this example, the IVR may then initiate a process to have a third party conference into the telephone call so that the third party can provide the piece of information to the IVR.

Conclusion

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for bridging a third party onto a communication between a first party and at least one of a second party and an interactive voice response system ("IVR") comprising:

receiving an indication to bridge the third party onto the communication between the first party and at least one of the second party and the IVR;

receiving a selection of a script from at least one of the second party and the IVR;

providing a script body associated with the selection of the script in response to receiving the selection of the script;

receiving an indication to send the third party a message; and in response to receiving the indication to send the third party the message:

linking at least one of a contact telephone number and a webpage address with the communication;

sending at least one of a text message and an email comprising the script body and at least one of the contact telephone number and the webpage address to a mobile device used by the third party;

receiving at least one of an inbound telephone call and a rendered webpage from the third party;

determining the at least one of the inbound telephone call and the rendered webpage was directed to at least one of the contact telephone number and the webpage address linked with the communication; and in response to determining the at least one of the inbound telephone call and the rendered webpage was directed to at least one of the contact telephone number and the webpage address linked with the communication, bridging the third party onto the communication so that the third party can converse with the first party and at least one of the second party and the IVR.

2. The method of claim 1, wherein the communication comprises at least one of a telephone call and a Web chat.

3. The method of claim 1, wherein at least one of the contact telephone number and the webpage address is embedded in at least one of the text message and the email so that the third party can select the at least one of the contact telephone number and the webpage address from the at least one of the text message and the email to initiate at least one of the inbound telephone call and the rendered webpage.

4. The method of claim 1 further comprising announcing on the communication that the third party has joined the communication.

5. The method of claim 1 further comprising, prior to bridging the third party onto the communication, providing an announcement to the third party indicating the third party is being bridged onto the communication.

6. The method of claim 1 further comprising, prior to bridging the third party onto the communication, requesting at least one of the first party, the second party, and the IVR to acknowledge the third party is to be bridged onto the communication, wherein the step of bridging the third party onto the communication is carried out in response to at least one of the first party, the second party, and the IVR indicating the third party should be bridged onto the communication.

7. A non-transitory, computer-readable medium comprising computer-executable instructions for bridging a third party onto a communication between a first party and at least one of a second party and an interactive voice response system (IVR), that when executed, cause at least one computer processor to:

receive an indication to bridge the third party onto the communication between the first party and at least one of the second party and the IVR;

receive a selection of a script from at least one of the second party and the IVR;
retrieve a script body associated with the selection of the script in response to receiving the selection of the script;
receive an indication to send the third party a text message; and
in response to receiving the indication to send the third party the text message:
  link at least one of a contact telephone number and a webpage address with the communication;
  send at least one of a text message and an email comprising the script body and at least one of the contact telephone number and the webpage address to a mobile device used by the third party;
  receive notice of at least one of an inbound telephone call and a rendered webpage from the third party;
  determine the at least one of the inbound telephone call and the rendered webpage was directed to at least one of the contact telephone number and the webpage address linked with the communication; and
  in response to determining at the least one of the inbound telephone call and the rendered webpage was directed to the at least one of the contact telephone number and the webpage address linked with the communication, bridge the third party onto the communication so that the third party can converse with the first party and at least one of the second party and the IVR.

8. The non-transitory, computer-readable medium of claim 7, wherein the communication comprises at least one of a telephone call and a Web chat.

9. The non-transitory, computer-readable medium of claim 7, wherein at least one of the contact telephone number and the webpage address is embedded in at least one of the text message and the email so that the third party can select the at least one of the contact telephone number and the webpage address from the at least one of the text message and the email to initiate at least one of the inbound telephone call and the rendered webpage.

10. The non-transitory, computer-readable medium of claim 7, wherein the computer-executable instructions cause the at least one computer processor to cause an announcement to be played on the communication that the third party has joined the communication.

11. The non-transitory, computer-readable medium of claim 7, wherein the computer-executable instructions cause the at least one computer processor to, prior to bridging the third party onto the communication, cause an announcement to be played to the third party indicating the third party is being bridged onto the communication.

12. The non-transitory, computer-readable medium of claim 7, wherein the computer-executable instructions cause the at least one computer processor to, prior to bridging the third party onto the communication, request at least one of the first party, the second party, and the IVR to acknowledge the third party is to be bridged onto the communication, wherein the at least one computer processor bridges the third party onto the communication in response to at least one of the first party, the second party, and the IVR indicating the third party should be bridged onto the communication.

13. A system for bridging a third party onto a telephone call between a first party and a second party comprising:
at least one computer processor configured to:
  receive an indication to bridge the third party onto the communication between the first party and at least one of the second party and the IVR;
  receive a selection of a script from at least one of the second party and the IVR;
  retrieve a script body associated with the selection of the script in response to receiving the selection of the script;
  receive an indication to send the third party a message; and
  in response to receiving the indication to send the third party the message:
    link at least one of a contact telephone number and a webpage address with the communication;
    send at least one of a text message and an email comprising the script body and at least one of the contact telephone number and the webpage address to a mobile device used by the third party;
    receive notice of at least one of an inbound telephone call and a rendered webpage from the third party;
    determine the at least one of the inbound telephone call and the rendered webpage was directed to at least one of the contact telephone number and the webpage address linked with the communication; and
    in response to determining the at least one of the inbound telephone call and the rendered webpage was directed to the at least one of the contact telephone number and the webpage address linked with the communication, bridge the third party onto the communication so that the third party can converse with the first party and at least one of the second party and the IVR.

14. The system of claim 13, wherein the communication comprises at least one of a telephone call and a Web chat.

15. The system of claim 13, wherein at least one of the contact telephone number and the webpage address is embedded in at least one of the text message and the email so that the third party can select the at least one of the contact telephone number and the webpage address from the at least one of the text message and the email to initiate at least one of the inbound telephone call and the rendered webpage.

16. The system of claim 13, wherein the at least one computer processor is configured to cause an announcement to be played on the communication that the third party has joined the communication.

17. The system of claim 13, wherein the at least one computer processor is configured to, prior to bridging the third party onto the communication, cause an announcement to be played to the third party indicating the third party is being bridged onto the communication.

18. The system of claim 13, wherein the at least one computer processor is configured to, prior to bridging the third party onto the communication, request at least one of the first party, the second party, and the IVR to acknowledge the third party is to be bridged onto the communication, wherein the at least one computer processor bridges the third party onto the communication in response to at least one of the first party, the second party, and the IVR indicating the third party should be bridged onto the communication.

\* \* \* \* \*